(12) United States Patent
Nakajima

(10) Patent No.: US 8,310,731 B2
(45) Date of Patent: Nov. 13, 2012

(54) IMAGE FORMING APPARATUS AND IMAGE FORMING METHOD

(75) Inventor: Yasuki Nakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 817 days.

(21) Appl. No.: 12/488,476

(22) Filed: Jun. 19, 2009

(65) Prior Publication Data

US 2009/0316216 A1    Dec. 24, 2009

(30) Foreign Application Priority Data

Jun. 24, 2008   (JP) ................................. 2008-164853

(51) Int. Cl.
*H04N 1/40*    (2006.01)
(52) U.S. Cl. ....................................................... 358/447
(58) Field of Classification Search ........................ None
See application file for complete search history.

(56) References Cited

U.S. PATENT DOCUMENTS

| 7,515,747 | B2 | 4/2009 | Okutomi et al. | |
| 2006/0104540 | A1* | 5/2006 | Haussecker et al. | 382/276 |

FOREIGN PATENT DOCUMENTS

| JP | 2004102562 A | 4/2004 |
| JP | 2004112644 A | 4/2004 |
| JP | 2004151833 A | 5/2004 |
| JP | 2004364053 A | 12/2004 |
| JP | 2006243140 A | 9/2006 |
| WO | 2004068862 A1 | 8/2004 |

* cited by examiner

*Primary Examiner* — Marivelisse Santiago Cordero
*Assistant Examiner* — John Wallace
(74) *Attorney, Agent, or Firm* — Fitzpatrick, Cella, Harper & Scinto

(57) ABSTRACT

In the present invention, paper fingerprint information of a document is read (step 801) and whether the paper fingerprint information is registered is judged (step 802). If it is judged that the paper fingerprint information is registered, read image data are acquired (step 814). Super-resolution processing is then applied to the read image data and read image data, which had been acquired from the document up to a previous time, and high-resolution image data are thereby acquired (step 816). Next, paper fingerprint information of a recording sheet is read (step 808), and the paper fingerprint information and added information, including information indicating a storage location of the read image data that have been acquired up until now in regard to the document, are stored in an associated manner (step 810). An image is then formed on the recording sheet based on the high-resolution image data (step 812).

17 Claims, 25 Drawing Sheets

| PAPER FINGERPRINT ID | ATTRIBUTE | ADDED INFORMATION | | IMAGE QUALITY LEVEL |
|---|---|---|---|---|
| | | LOW-RESOLUTION IMAGE PATH | HIGH-RESOLUTION IMAGE PATH | |
| AAA001 | org | home/LowResoImg/L_AAA001 | home/HighResoImg/H_AAA001 | level1 |
| AAA002 | copy | home/LowResoImg/L_AAA001 | home/HighResoImg/H_AAA001 | level5 |
| AAA003 | copy | home/LowResoImg/L_AAA001 | home/HighResoImg/H_AAA001 | level4 |
| AAA004 | copy | home/LowResoImg/L_AAA001 | home/HighResoImg/H_AAA001 | level3 |
| ⋮ | ⋮ | ⋮ | ⋮ | ⋮ |
| ZZZ001 | org | home/LowResoImg/L_AAA001 | home/HighResoImg/H_ZZZ001 | level1 |
| ZZZ002 | copy | home/LowResoImg/L_AAA001 | home/HighResoImg/H_AAA001 | level5 |

FIG.4

|  | 501 | 502 | 503 | 504 |
|---|---|---|---|---|
|  | DIRECTORY | IMAGE ID | IMAGE QUALITY LEVEL | READING DATE/TIME |
|  | home/LowResoImg/L_AAA001 | L_022407001 | level1 | 08:30 02/24/07 |
|  | home/LowResoImg/L_AAA001 | L_022407002 | level1 | 08:30 02/24/07 |
|  | home/LowResoImg/L_AAA001 | L_042307001 | level5 | 09:00 02/24/07 |
|  | home/LowResoImg/L_AAA001 | L_042307002 | level3 | 15:30 04/23/07 |
|  | ⋮ | ⋮ | ⋮ | ⋮ |
|  | home/LowResoImg/L_AAA001 | L_092907001 | level1 | 14:55 09/29/07 |
|  | ⋮ | ⋮ | ⋮ | ⋮ |
|  | home/LowResoImg/L_ZZZ001 | L_022407005 | level1 | 08:30 02/24/07 |
|  | home/LowResoImg/L_ZZZ001 | L_022407008 | level1 | 08:30 02/24/07 |
|  | ⋮ | ⋮ | ⋮ | ⋮ |
|  | home/LowResoImg/L_ZZZ001 | L_042307012 | level2 | 17:30 04/23/07 |

FIG.5

| DIRECTORY | IMAGE ID | IMAGE QUALITY LEVEL | GENERATION DATE/TIME |
|---|---|---|---|
| home/HighResoImg/H_AAA001 | H_092907 | level3 | 08:30 09/29/07 |
| home/HighResoImg/H_BBA001 | H_121007 | level4 | 09:30 12/10/07 |
| home/HighResoImg/H_CCC001 | H_101907 | level2 | 10:30 10/19/07 |
| ⋮ | ⋮ | ⋮ | ⋮ |
| home/HighResoImg/H_ZZZ001 | H_043007 | level2 | 15:05 04/23/07 |

FIG.6

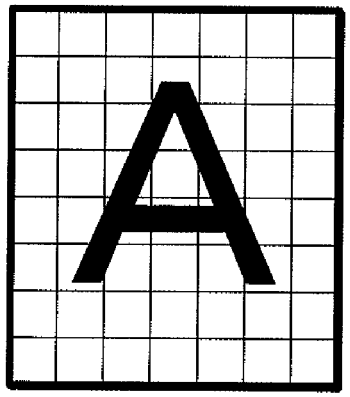
IMAGE OF FIG. 18E
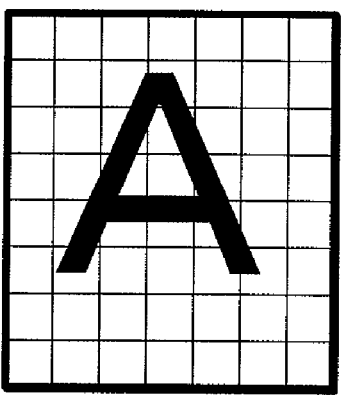
IMAGE OF FIG. 18G
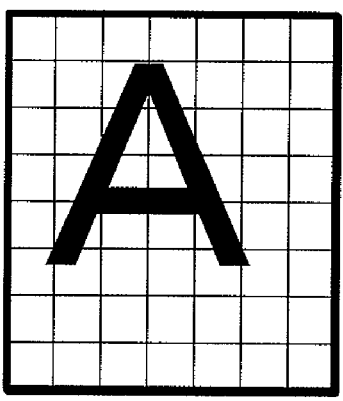
IMAGE OF FIG. 18I
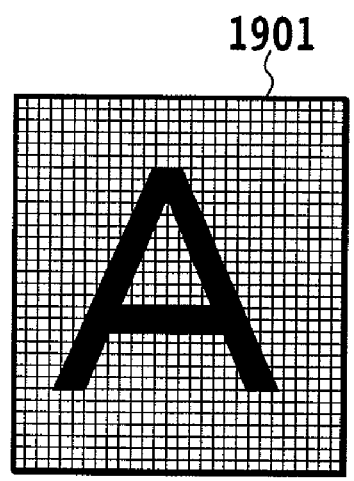
FIG.19

◇ PIXEL OF SUBJECT IMAGE

● PIXEL SUBJECT TO SUPER-RESOLUTION PROCESSING

IMAGE FORMING APPARATUS AND IMAGE FORMING METHOD

BACKGROUND OF THE INVENTION

1. Field of the Invention

The present invention relates to an image forming apparatus and an image forming method, and more specifically relates to an image forming apparatus and an image forming method by which printing is performed upon reading a document.

2. Description of the Related Art

Recently, office networking has been progressing along with digitalization and colorization of documents that are handled. By digitalization, processing and transfer of documents are facilitated and efficiency of work is promoted. In addition, by colorization, documents that are effective and beautiful in appearance are prepared. Given the above, effective intake and output performances in regard to prepared image data are being required of multifunction apparatuses that are installed in offices.

A configuration for input of image data, that is, a configuration of a reading apparatus (scanner, etc.) in a multifunction apparatus is a performance factor that is most intimately related to output image quality in a document image data intake or copying operation. As specific factors, reading speed and reading resolution can be cited.

A reducing optical system is one configuration of a reading apparatus in a multifunction apparatus. Generally, in a high-performance multifunction apparatus, the reducing optical system configuration is adopted in many cases to maintain the reading speed, reading resolution, read image data quality, and other performance factors. In addition, a CCD (Charged Coupled Device) is often the device used in a reducing optical system type reading apparatus.

Also, a contact optical system is another configuration of a reading apparatus in a multifunction apparatus. Generally, in a popular-model multifunction apparatus, the contact optical system configuration is adopted in many cases to maintain the reading speed, the reading resolution, and a read image data quality befitting of a popular-model apparatus, and to keep a unit price low. In addition, due to configuration restrictions, a CIS (Contact Image Sensor) is often the device used in a contact optical system type reading apparatus.

Although as described above, either the reducing optical system configuration or the contact optical system configuration is conventionally adopted as the configuration of the reading apparatus of a multifunction apparatus, what is common to both configurations is that the reading resolution is determined according to the number of pixel sensors positioned along a main scan direction.

Also, the reading resolution, that is, the number of pixel sensors directly influences the unit price of the reading device. That is, to realize high-resolution reading of image data, the reading apparatus must be configured using a device having a large number of pixel sensors, even if the unit price becomes high.

The performance that is demanded of a multifunction apparatus differs according to a usage environment that is applicable. For example, a multifunction apparatus that includes a popular-model-level reading apparatus and a high-performance recording apparatus (printer or other image forming apparatus) may be demanded in an environment where printout from a PC is performed often and a usage rate of a copy function is low.

It is generally known that when a paper document is copied, a copy output image is degraded in comparison to the original document. Also, the image quality of the copy output is strongly dependent on the reading resolution of the reading apparatus and a recording resolution performance of the recording apparatus. That is, if the reading resolution is low, an image quality degradation degree of the copy output becomes high. Obviously, as copying is repeated as child copying, grandchild copying, etc., the image quality degrades further.

A document output method, with which a storage location information of original document data, stored in a database, is embedded in a paper document and, in copying the paper document, the original document data are downloaded based on the storage location information and printed, is described in Japanese Patent Laid-Open No. 2004-364053. By this method, the image quality of the copy output does not degrade and a fixed image quality can be maintained constantly.

In the present Specification, "original document data" refers to image data to be printed that are stored in some storage location (server, etc.) and are the image data to be used as printing data when an image to be printed is read by a reading apparatus and printed.

Furthermore, "super-resolution processing" is being researched as a process for improving the resolution. In super-resolution processing, a plurality of sets of image data that have been read at low resolution are used to significantly improve the inherent resolution of the image data. By using a super-resolution processing art, a plurality of sets of image data read at 300 dpi can be used to form image data with a resolution of 1200 dpi.

FIGS. 18A to 18I illustrate a concept of conventional super-resolution processing. Among these figures, FIG. 18A shows image data to be read by a reading apparatus. A pixel configuration in a case of reading the read image data (FIG. 18A), for example, at 1200 dpi is shown in FIG. 18B. In FIG. 18B, a lattice cell indicated by symbol 1201 indicates pixel data formed at the resolution at which reading was performed (reading resolution). That is, a distance n between pixels corresponds to being a pixel sensor distance when reading was performed at the resolution of 1200 dpi.

A pixel configuration in a case of reading the same image size (the read image data shown in FIG. 18A) at a resolution of 300 dpi is shown in FIG. 18C. As in FIG. 18B, a lattice cell indicated by symbol 1202 indicates pixel data formed at the resolution in which the reading was performed (reading resolution). Thus, on the basis of the distance n between pixels for 1200 dpi, the distance between pixels in the case of reading at 300 dpi is in a direction of being rougher and is 4n.

Because a reproducibility of a read image is proportional to the resolution, a difference of image quality is very clear when the image data read at 1200 dpi (FIG. 18B) and the image data read at 300 dpi (FIG. 18C) are compared as they are.

Super-resolution processing is an art of generating the image data of FIG. 18A from a plurality of sets of image data corresponding to FIG. 18C. By adopting this art, even when the resolution inherent to a reading apparatus is not so high, a read image equivalent to that of a high-resolution device can be formed.

However, adopting the super-resolution processing art needs to meet a certain condition. That is, the certain condition is that the respective low-resolution source images on which the super-resolution processing is to be performed must have a phase shift of less than one pixel in a main scan direction or a subscan direction in-between.

The condition required of super-resolution processing shall now be described using FIG. 18D onward. FIG. 18D is a diagram of the pixel configuration in a case of reading the document image data of FIG. 18A at a resolution of 300 dpi and at the same phase as the document image data. In this figure, because the phase of a reading sensor is matched with the document image, the read image data (FIG. 18E) are the same as the data of FIG. 18D. The read image data, shown in FIG. 18E, make up a first subject image on which the super-resolution processing is performed.

Next, the document image data of FIG. 18A are then read, as shown in FIG. 18F, at a resolution of 300 dpi upon shifting by Δx (Δx<4n) in the main scan direction and by Δy (Δy<4n) in the subscan direction on the basis of the document image data. In this case, the phases of the read image data (FIG. 18G) differ from those of the document image data and are shifted by Δx in the left main scan direction and by Δy in the upper subscan direction in the figure. The read image data, shown in FIG. 18G, make up a second subject image on which the super-resolution processing is performed.

The document image data of FIG. 18A are further read upon shifting just by predetermined phases. That is, as shown in FIG. 18H, the data are read at a resolution of 300 dpi and upon shifting by Δx' (Δx'<4n, Δx<Δx') in the main scan direction and by Δy' (Δy'<4n, Δy<Δy') in the subscan direction on the basis of the document image data. In this case, the phases of the read image data (FIG. 18I) differ from those of the document image data and are shifted by Δx' in the left main scan direction and by Δy' in the upper subscan direction in the figure. The read image data, shown in FIG. 18I, make up a third subject image on which the super-resolution processing is performed.

When the plurality of sets of read data those are low-resolution image data that differ in phase have been obtained, forming into high resolution by the super-resolution processing becomes possible. FIG. 19 illustrates a concept of forming high-resolution image data from the three sets of low-resolution image data. Here, it is shown that by applying the super-resolution processing to the low-resolution image data of FIG. 18E, FIG. 18G, and FIG. 18I that differ in phase, high-resolution image data, such as indicated by symbol 1901, are obtained.

An example of a method of preparing a resolution image from a plurality of low-resolution images that is performed by an image processing apparatus that has acquired the low-resolution images (for example, the read image data shown in FIGS. 18E, 18G, and 18I) shall now be described.

In accordance with a user input indicating acquisition of a high-resolution image from the low-resolution images, the image processing apparatus acquires the read image data shown in FIGS. 18E, 18G, and 18I from the reading apparatus and performs the super-resolution processing based on the acquired three sets of read image data shown in FIGS. 18E, 18G, and 18I.

Among the three sets of read image data shown in FIGS. 18E, 18G, and 18I, there are phase shifts of less than one pixel in the main scan direction and the subscan direction and conversion to high resolution can be performed using these minute shifts. Thus, among the respective pixels that make up the generated super-resolution image (these pixels shall be referred to hereinafter as "generated pixels"), there are pixels that exist neither in the first subject image nor in the second and third subject images. For such a pixel, pixel data, expressing pixel values of pixels existing in a neighborhood of the generated pixel, are used to perform synthesis by a predetermined interpolation process and thereby perform conversion to high resolution. As the interpolation process, an interpolation process by a bilinear method, a bicubic method, or a nearest neighbor method, etc., may be used.

FIG. 20 is a diagram for describing an interpolation process by a conventional, bilinear method.

In FIG. 20, when the interpolation process by the bilinear method is performed, a nearest neighbor pixel 2002, which is the closest in distance from a position of a generated pixel 2001, is extracted from the first subject image and the second and third subject images. Four pixels surrounding the generated pixel position are then determined as neighboring pixels 2002 to 2005 from among the pixels of the subject images (low-resolution images) of FIG. 20, and a data value of the generated pixel is obtained by determining an average of values, with which predetermined weights are applied to the data values of the neighboring pixels, according to the following formula:

$$f(x,y)=[|x1-x|\{|y1-y|f(x0,y0)+|y-y0|f(x0,y1)\}+|x-x0|\{|y1-y|f(x,y0)+|y-y0|f(x1,y1)\}]/|x1-x0||y1-y0|$$

By repeating the above process for respective generated pixel positions, the image processing apparatus can obtain high-resolution converted image data, such as indicated by symbol 1901.

In addition, other examples of super-resolution processing by using a plurality of sets of low-resolution image data to generate high-resolution image data that cannot be obtained by the reading apparatus are described in International Patent Publication No. 2004/068862 Pamphlet, Japanese Patent Laid-Open No. 2004-102562, Japanese Patent Laid-Open No. 2004-112644, Japanese Patent Laid-Open No. 2004-151833, Japanese Patent Laid-Open No. 2006-243140, etc.

As mentioned above, when a paper document is copied, the copy output image is degraded in comparison to the original document, and when the reading resolution is low, the image quality degradation degree of the copy output becomes high.

The art disclosed in Japanese Patent Laid-Open No. 2004-364053 is premised on the original document data being stored as electronic data in a database. However, in a case where the original document exists only as a paper document, the image quality of the read image is maintained as that of the original document data and thus if the reading resolution of the reading apparatus is low, the resolution of the original document data may be degraded significantly. That is, in a case where the original document data registered in a server or other storage location are not PDL data or other electronic data but are image data read from the paper document by the reading apparatus, the image quality of the original document data varies according to the resolution of the reading apparatus. In particular, because the image quality of the read image data will be of low image quality if the reading resolution is low as mentioned above, in a case where the reading resolution of the reading apparatus is low, the image quality of the read image data will be low and consequently, the image quality of the original document data will be low.

SUMMARY OF THE INVENTION

The present invention was made in view of the above issues and an object thereof is to provide an image forming apparatus and an image forming method that enable printing of high image quality even in a case of copying an original document or copying the original document over several generations.

In the present specification, "generation" indicates the number of times that copying has been performed from an original document. For example, a "first generation copy (child copy)" refers to a copy obtained by copying (child copying) from the original document. Also, a "second generation copy (grandchild copy)" refers to a copy obtained by copying (grandchild copying) from a child copy. That is, a copy which is obtained by second copying from original document is indicated. Therefore, an N-th generation (N: an integer not less than 1) copy thus refers to a copy of the N-th generation from the original document.

To achieve the above object, the present invention provides an image forming apparatus including: a unit, optically scanning a document and thereby reading an image and acquiring read image data; a unit, forming an image on a recording medium; a unit, reading identification information unique to the recording medium; a unit applying super-resolution processing on a plurality of sets of image data and thereby acquiring high-resolution image data of higher resolution than the plurality of sets of image data; a unit, generating added information concerning the image formed on the recording medium; and a memory, storing the read image data; and where the added information is managed in association with the identification information unique to the recording medium, the added information includes information indicating a storage location, in the memory, of the read image data acquired from the scanned document, the high-resolution image data acquiring unit acquires, from the memory and on basis of the information indicating the storage location of the read image data, a plurality of sets of read image data, which had been acquired from the scanned document, and applies the super-resolution processing on the acquired sets of read image data to acquire the high-resolution image data, and the image forming unit forms the image on the recording medium based on the high-resolution image data.

The present invention also provides an image forming apparatus including: a unit, reading a document and acquiring read image data; a memory, storing the read image data; a unit, applying super-resolution processing on the read image data and read image data, which had been acquired from the document up to a previous reading and are stored in the memory, and thereby generating a high-resolution image of higher resolution than any of the read image data; and a unit, making the high-resolution image be stored in the memory and forming an image on a recording medium based on the high-resolution image data.

The present invention also provides an image forming method including: a step of reading identification information unique to a document; and a step of judging whether or not the read identification information unique to the document is managed in association with added information that includes information indicating a storage location of read image data acquired in relation to the document; and including in a case where it is judged that the read identification information unique to the document is managed in association with the added information, a step of optically scanning the document to read an image and acquire read image data; a step of applying super-resolution processing on the acquired read image data and read image data, which had been acquired from the document up to a previous acquisition, to acquire high-resolution image data of higher resolution than any of the read image data; a step of storing, in an associated manner, identification information unique to the recording medium and the added information that includes information indicating storage locations of read image data that had been acquired up to a present point in relation to the document; and a step of forming an image on the recording medium based on the high-resolution image data.

The present invention also provides an image forming method including: a step of reading a document and acquiring read image data; a step of making a memory store the read image data; a step of applying super-resolution processing on the read image data and read image data, which had been acquired from the document up to a previous reading and are stored in the memory, to generate high-resolution image of higher resolution than any of the read image data; a step of making the memory store the high-resolution image and forming an image on a recoding medium based on the high-resolution image data.

Further features of the present invention will become apparent from the following description of exemplary embodiments (with reference to the attached drawings).

BRIEF DESCRIPTION OF THE DRAWINGS

FIG. 4 is a conceptual diagram of a paper fingerprint management table handled by the multifunction apparatus to which the embodiment of the present invention is applied;

FIG. 5 is a conceptual diagram of a low-resolution image management table handled by the multifunction apparatus to which the embodiment of the present invention is applied;

FIG. 6 is a conceptual diagram of a high-resolution image management table handled by the multifunction apparatus to which the embodiment of the present invention is applied;

FIG. 19 is conceptual diagram of a conventional method for forming high-resolution image data from three sets of low-resolution image data;

DESCRIPTION OF THE EMBODIMENTS

Figure 1:
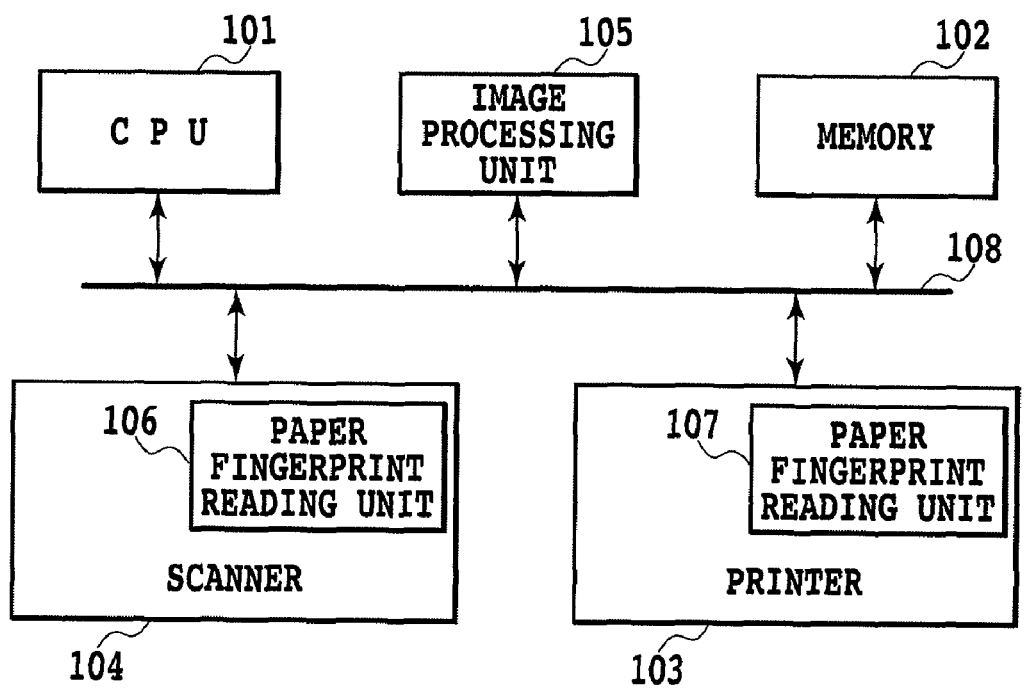
FIG. 1 is a diagram of a configuration of a multifunction apparatus according to an embodiment of the present invention.

Embodiments of the present invention shall now be described with reference to the drawings. In the drawings described below, components having the same function are provided with the same symbol and redundant description is omitted.

First Embodiment

FIG. 1 is a schematic view of process blocks for handling an image in a multifunction apparatus according to a first embodiment of the present invention.

Based on a control program, etc., stored in an unillustrated ROM, a CPU 101 performs overall control of access to various connected devices and performs overall control of various data processing inside the multifunction apparatus. A memory 102 is a hard disk drive or other large-scale memory and is capable of storing a system software and image data. Also, symbol 103 indicates a printer that is configured with a recording engine, for example, of an ink jet type or an electronic photography type.

A scanner 104 optically reads (scans) a document placed on a platen and performs conversion of the document to electronic data. In the present embodiment, the scanner 104 may use, for example, a CMOS area sensor, which is also used in a digital camera, as a device for optically reading the document. Unlike a line-unit sensor, the area sensor has data-reading pixel sensors arrayed in two dimensions along a main scan direction and a subscan direction.

Symbol 105 indicates an image processing unit that applies various image processing on the image data read by the scanner 104. A process block that performs super-resolution processing is also included as a portion of a configuration of the image processing unit 105. That is, the image processing unit 105 can thus perform the super-resolution processing on image data that it has received.

As mentioned above, performing of the super-resolution processing requires a plurality of successive sets of image data (low-resolution image data), which are minutely shifted in document reading position in at least one of either the main scan direction or the subscan direction with respect to a single image read at a reading resolution of the scanner 104. That is, a plurality of successive sets of image data that are slightly shifted in document reading position are required. Among the successive sets of low-resolution image data, the position of the document read by the sensor must be shifted by less than one pixel between adjacent sets of image data.

In the present specification, a position of a read pixel in a document image is referred to as a "phase." Also, shifting of this phase is referred to as "shifting of the phase," and a shift of the read pixel is referred to as a "phase shift."

In the present embodiment, by the image reading by the scanner 104 being performed by the area sensor, the plurality of sets of image data that are successively shifted in phase can be acquired.

Figure 14:
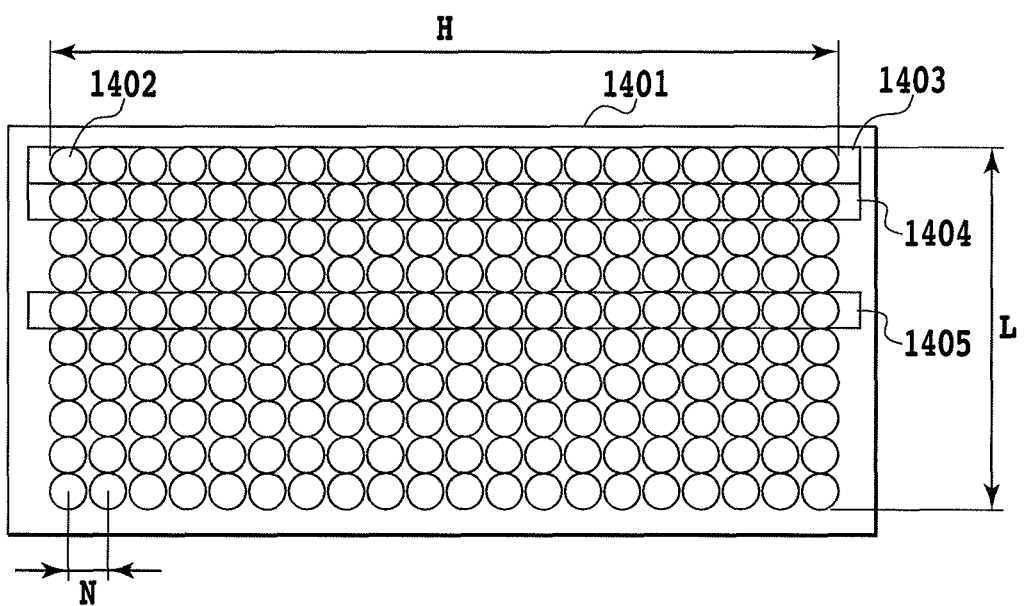
FIG. 14 is a diagram of a configuration of an area sensor according to the embodiment of the present invention.

FIG. 14 is a diagram of a configuration of the area sensor included in the scanner 104 according to the present embodiment.

In FIG. 14, symbol 1401 indicates the area sensor. Symbol 1402 indicates a pixel sensor in the area sensor 1401, and pixel sensors 1402 of H pixels and L pixels are positioned in the main scan direction and the subscan direction, respectively. A single pixel may correspond to color pixel sensors that are configured for RGB by dividing the pixel sensor for the single pixel into four equal parts. Also, the reading resolution of the area sensor 1401 is determined by a distance N between pixel sensors 1402. To simplify description, it shall be deemed that in the present embodiment, the area sensor is configured from pixel sensors of 20 pixels in the main scan direction and 10 pixels in the subscan direction as shown in FIG. 14.

In this configuration, image data read by the pixel sensors of a line in a black frame indicated by symbol 1403 become the image data making up an uppermost end of the read document. Also, the set of pixel sensors of the line in the black frame indicated by symbol 1403 shall be referred to collectively as a "line sensor 1403."

Likewise, image data read by the pixel sensors of a line in a black frame indicated by symbol 1404 are image data of a region that differs from the region read by the line sensor 1403, that is, are image data of positions that are lower in the vertical direction. Symbol 1405 indicates image data of positions four pixels lower in the vertical direction from the region read by the line sensor 1403. In addition, the set of pixel sensors of the line in the black frame indicated by symbol 1404 shall be referred to collectively as a "line sensor 1404," and the set of pixel sensors of the line in the black frame indicated by symbol 1405 shall be referred to collectively as a "line sensor 1405."

Thus, when an area sensor is used, the pixel sensors making up the area sensor all pick up different positions of the read document because the image data are picked up in a form of a two-dimensional region.

When the document placed on the platen is read by the scanner 104 with the area sensor 1401 of the above configuration, a reading operation is performed by the respective line sensors making up the area sensor 1401, which is a collection of the pixel sensors, such as the line sensors 1404 and 1405.

Figure 16:
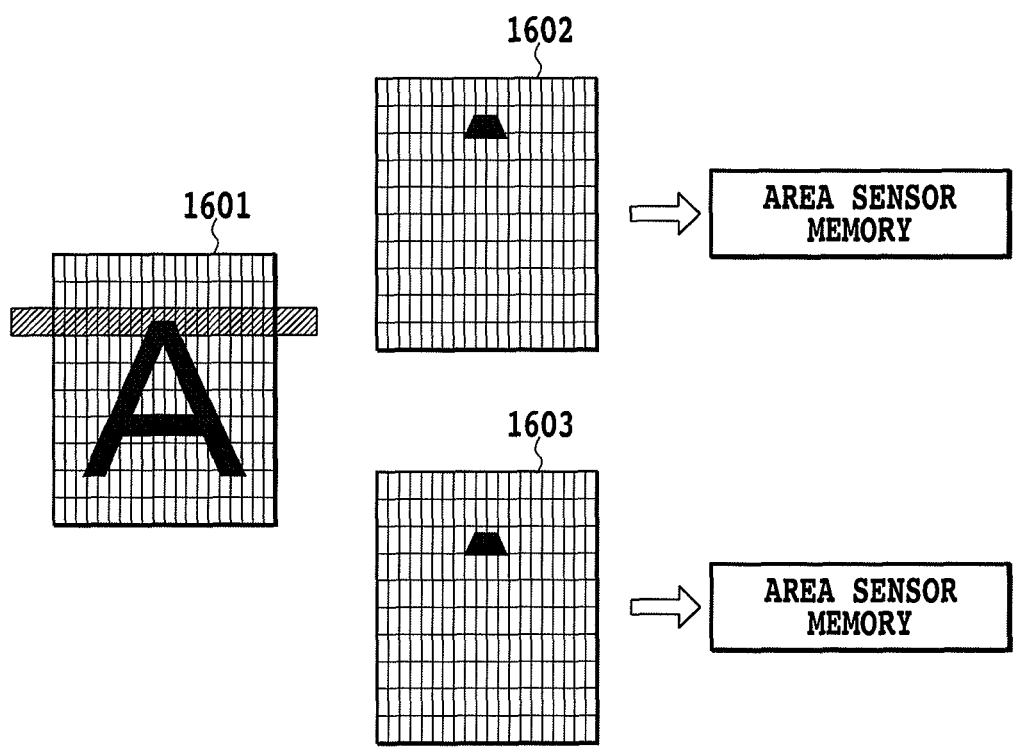
FIG. 16 is a diagram of a method for acquiring line image data according to the embodiment of the present invention.
Figure 17:
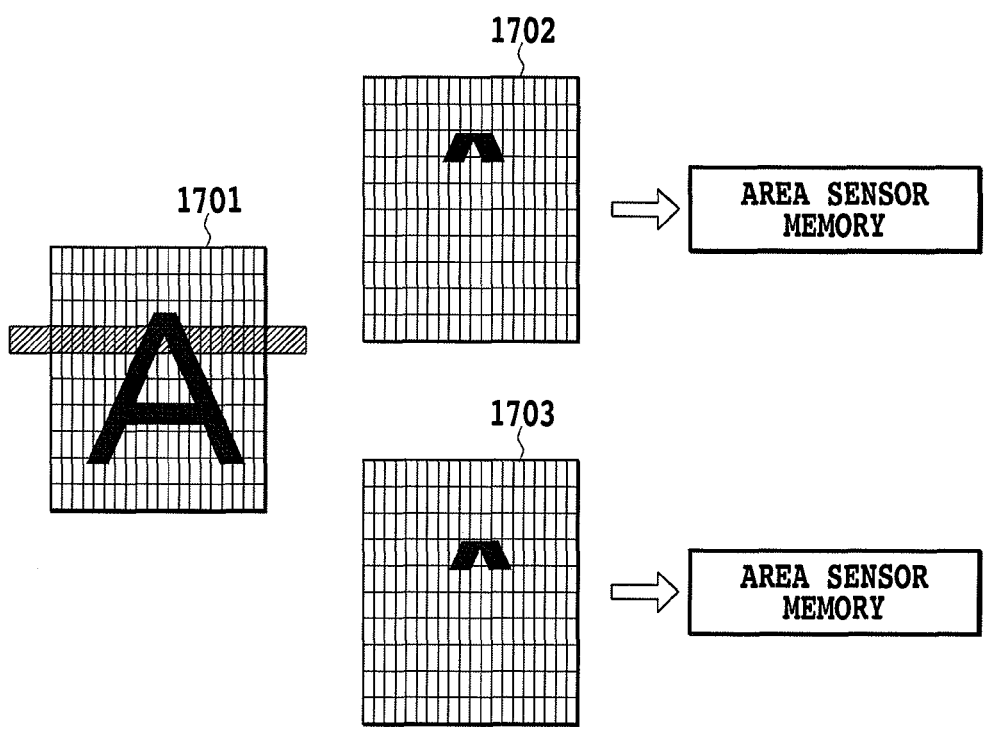
FIG. 17 is a diagram of the method for acquiring line image data according to the embodiment of the present invention.
Figure 18D:
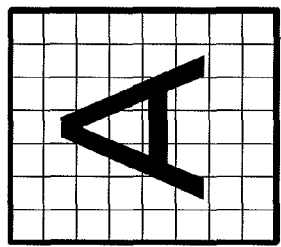
FIG. 18A to 18I are conceptual diagrams of a case of applying conventional super-resolution processing to a still image.
Figure 18F:
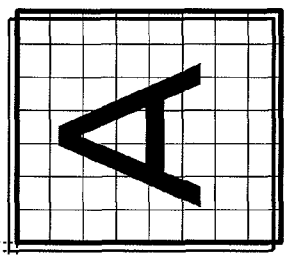
Figure 18H:
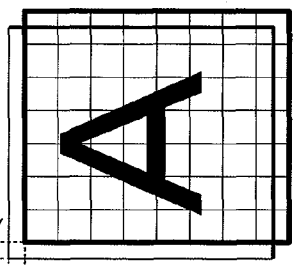
Figure 18E:
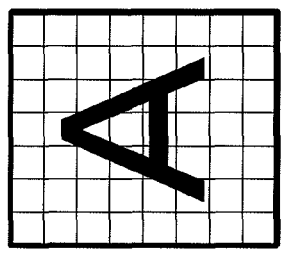
Figure 18G:
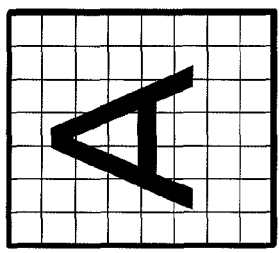
Figure 18I:
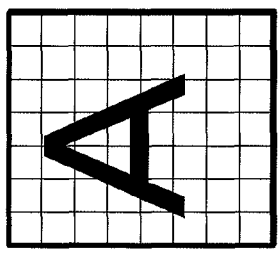
Figure 18B:
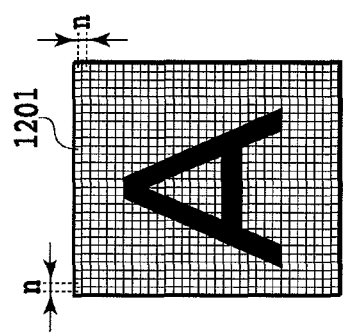
Figure 18A:
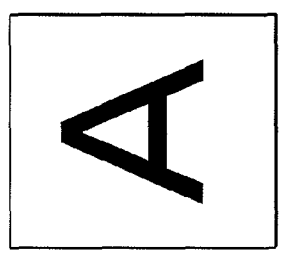
Figure 18C:
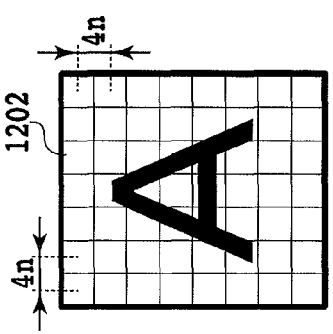
Figure 20:
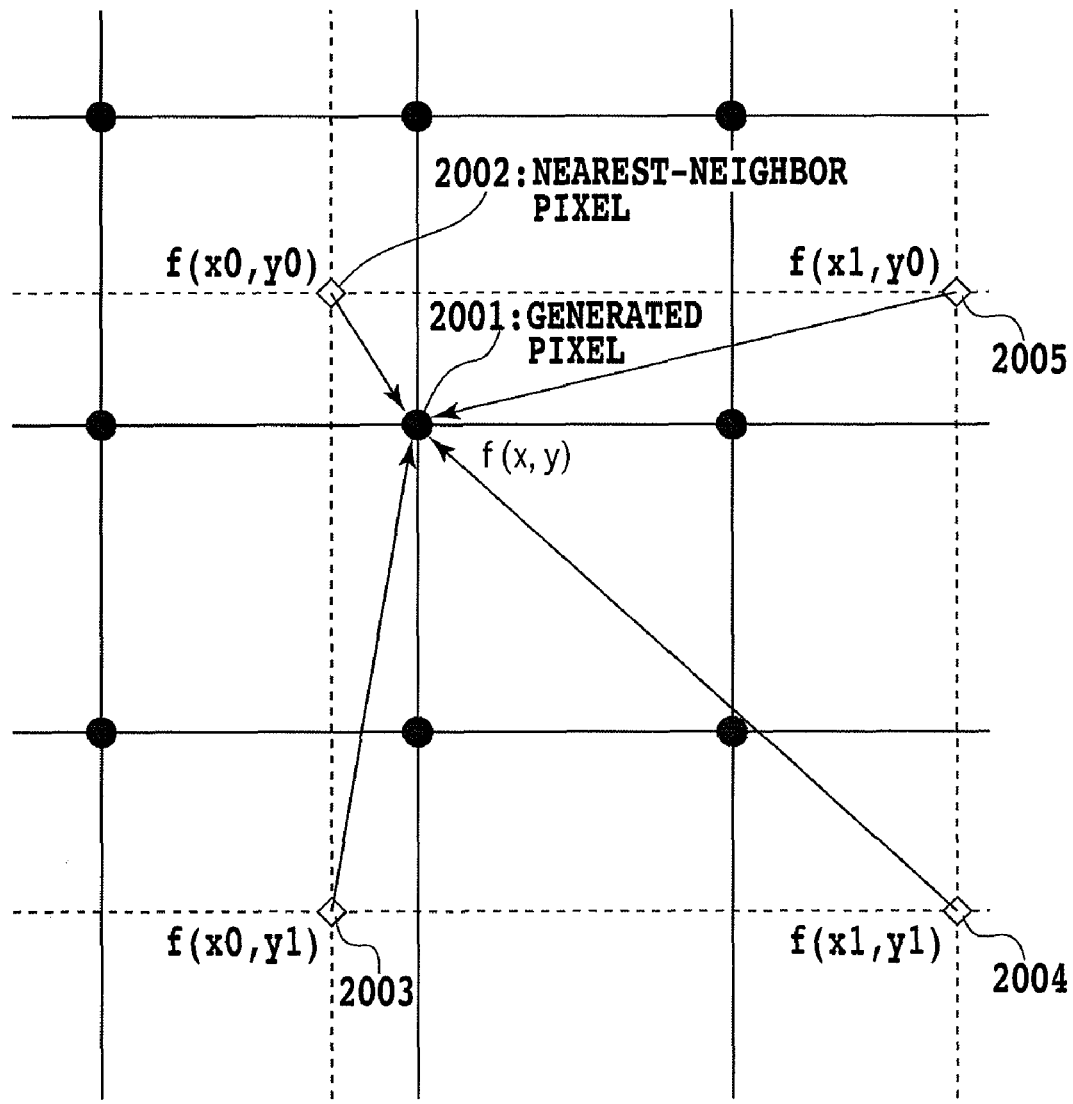
FIG. 20 is a diagram for describing an interpolation process by a conventional bilinear method.

As an example, a form of the image data read by the line sensors 1404 and 1405 shall now be described using FIGS. 15 to 17.

Figure 15:
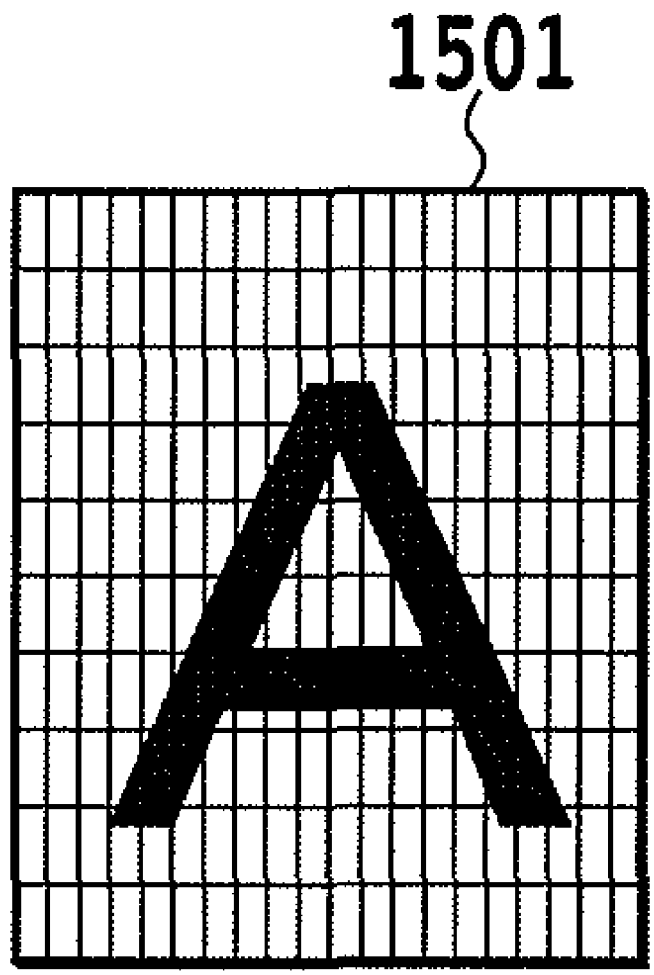
FIG. 15 is a diagram of an image read by the area sensor according to the embodiment of the present invention.

Image data 1501 to be read are shown in FIG. 15. In FIG. 15, lattice cells correspond to the reading resolution of the pixel sensors making up the line sensors 1404 and 1405.

When a reading unit (not shown) that the scanner 104 has is driven and moves in the subscan direction below the platen, the image data input into the line sensors 1404 and 1405 are read successively. That is, among the image data 1501, which make up the document, portions corresponding to a line width corresponding to the position of the reading unit are read consecutively.

A process of reading the image 1501, which is the document, shall now be described.

When the reading unit moves in the subscan direction below the platen, light from a light source is illuminated on a shaded portion of the image data indicated by symbol 1601. First, at a certain instant, light from the light source is illuminated on the shaded portion of the image data 1601. Then, the area sensor 1401 detects the light and detects the image data of the line width portion that is the portion illuminated by the light. For example, at this instant, the line sensor 1404 detects image data such as indicated by symbol 1602. At the same time, the line sensor 1405 detects image data such as indicated by symbol 1603. There is a shift in reading position between the two sets of image data 1602 and 1603 because the two line sensor 1404 and 1405 are positioned across a physical distance in the subscan direction.

The read sets of image data 1602 and 1603 are handled as different sets of image data according to the line sensors that make up the scanner 104. The sets of image data 1602 and 1603 are thus respectively and separately stored in a line sensor 1404 memory (not shown) and a line sensor 1405 memory (not shown) included in the memory 102.

Next, the reading unit moves and the light source moves. The position of the document image detected by the line sensors making up the scanner 104 thus changes as indicated by symbol 1701, and the line sensor 1404 detects image data such as indicated by symbol 1702 and the line sensor 1405 detects image data such as indicated by symbol 1703. The sets of image data 1702 and 1703 obtained by this detection are respectively and separately stored in the line sensor 1404 memory (not shown) and the line sensor 1405 memory (not shown).

The image data are thus successively detected by the line sensors and stored in the memory according to the movement of the reading unit. A plurality of sets of image data having phase shifts in the subscan in the direction can thus be obtained. As sets of image data having phase shifts in the subscan direction, sets of image data corresponding to the number of line sensors are obtained.

Next, a method of using the area sensor in the apparatus used in the present embodiment shall now be described.

First, the area sensor such as shown in FIG. 14 is mounted obliquely on the scanner 104.

Figure 21:
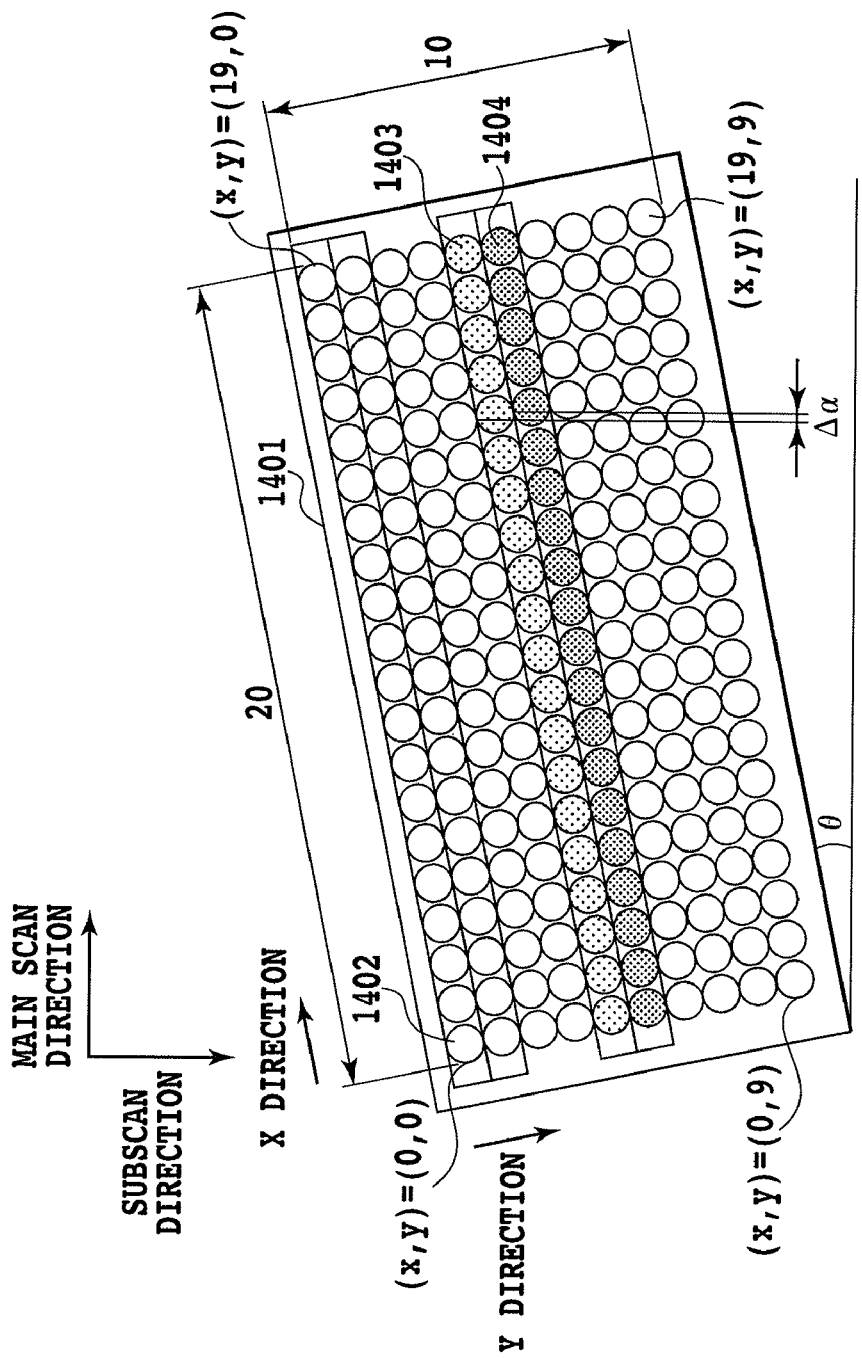
FIG. 21 is a configuration diagram of a case of obliquely mounting the area sensor according to the embodiment of the present invention.

FIG. 21 shows an example of a form of mounting of the area sensor in the present embodiment.

In FIG. 14, the pixel sensors 1402 are configured as pixel sensors of 20 pixels in the main scan direction and 10 pixels in the subscan direction.

The area sensor is mounted obliquely with respect to the main scan direction and the subscan direction from a setting position that serves as a reference. That is, the area sensor is set with an angle θ being formed by the line sensor disposed lowermost in the area sensor with respect to the main scan direction of the sensor when the sensor was set in the setting position that serves as the reference.

A position of each constituent pixel sensor shall be expressed with an upper left end of the area sensor being an origin, the main scan direction being an x direction, and the subscan direction being a y direction.

That is, the coordinates of the upper left end are: (x, y) (0, 0), and the coordinates of the upper right end are: (x, y)=(19, 0).

Likewise, the coordinates of the lower left end are: (x, y)=(0, 9), and the coordinates of the lower right end are: (x, y)=(19, 9).

Symbol 1403 indicates a collection of pixel sensors corresponding to a single line that makes up the area sensor 1401. Specifically, this line is made up of 20 pixel sensors making up the main scan direction. That is, this line is made up of the pixel sensors of coordinate positions (0, 4), (1, 4), (2, 4), . . . , (19, 4). In the description that follows, the plurality of pixel sensors surrounded by symbol 1403 shall be referred to as the "line sensor 1403."

Likewise, symbol 1404 indicates a collection made up of the pixel sensors of coordinate positions (0, 5), (1, 5), (2, 5), . . . , (19, 5), and in the description this shall be referred to as the "line sensor 1404."

In the present embodiment, image data of the document placed on the platen are read by driving the reading unit that includes the area sensor 1401 mounted on the scanner 104.

Next, a form of the image data read by the line sensors 1403 and 1404 shall now be described.

In the following description, the image data to be read shall be the image data shown in FIG. 15. In this figure, the lattice cells correspond to the resolution of the pixel sensors making up the line sensor 1403 or 1404. Although the document image is read as shown in FIGS. 16 and 17, by being inclined by θ, image data that are inclined by the angle θ are obtained.

Figure 22:
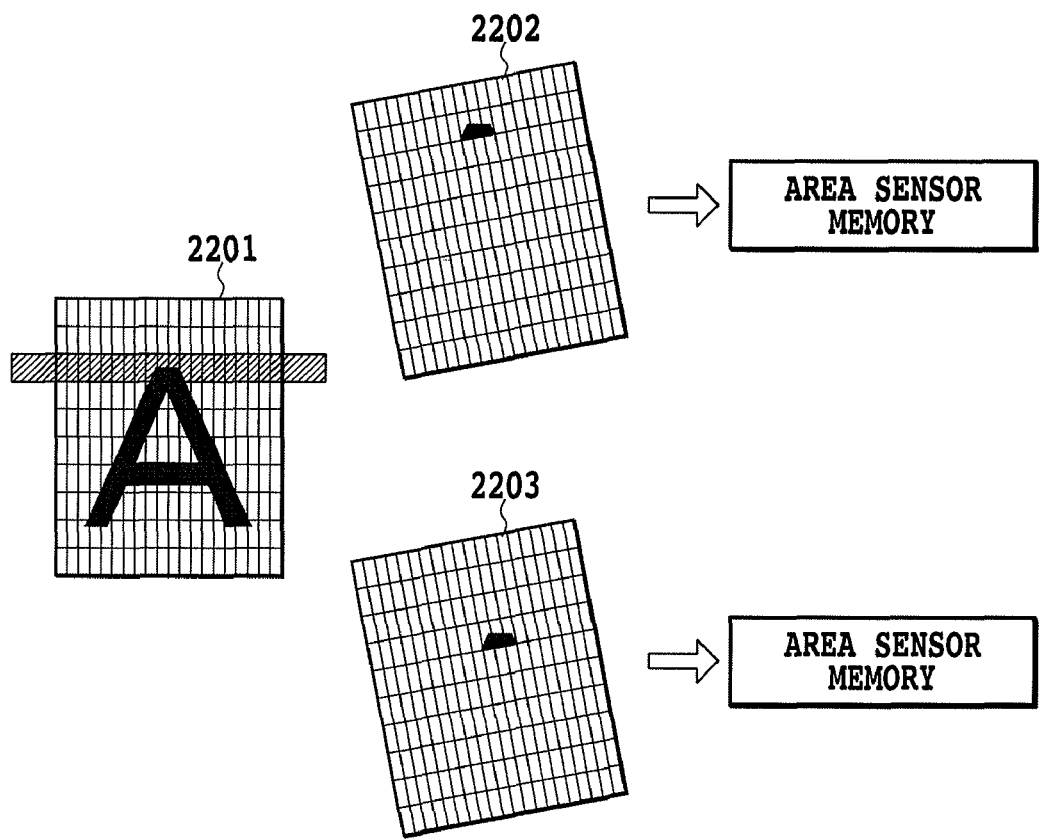
FIG. 22 is a diagram of a method for acquiring line image data of the obliquely mounted area sensor according to the embodiment of the present invention.

For example, although if the area sensor is not inclined inherently, positions indicated by a shaded portion of symbol 2201 in FIG. 22 are read, the line sensors 1403 and 1404 detect sets of image data indicated by symbols 2202 and 2203 in FIG. 22 because the area sensor is inclined. These sets of image data are respectively stored as they are in the inclined forms in an area sensor memory or other memory medium.

Figure 23:
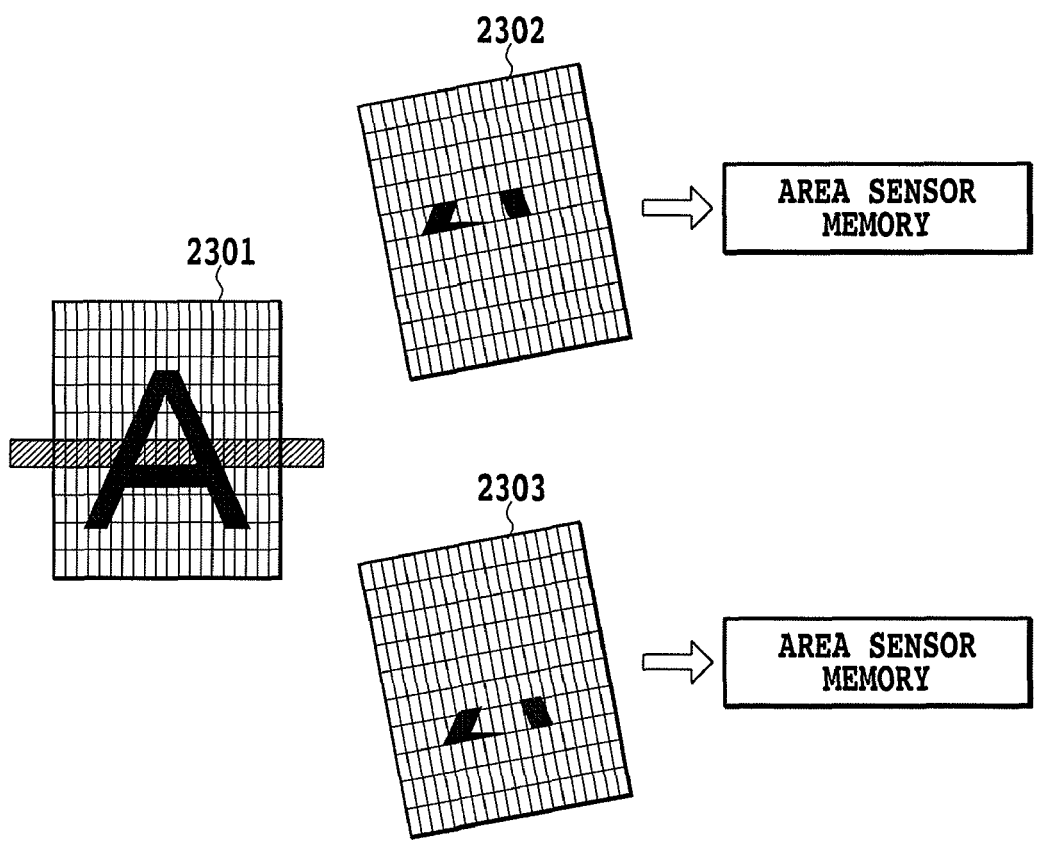
FIG. 23 is a diagram of the method for acquiring line image data of the obliquely mounted area sensor according to the embodiment of the present invention.

Likewise, when the sensor unit moves, the light source moves, and positions indicated by a shaded portion of symbol 2301 in FIG. 23 are read, and the line sensors 1403 and 1404 detect sets of image data indicated by symbols 2302 and 2303 in FIG. 23. These sets of image data are respectively stored in the area sensor memory or other memory medium.

Figure 24:
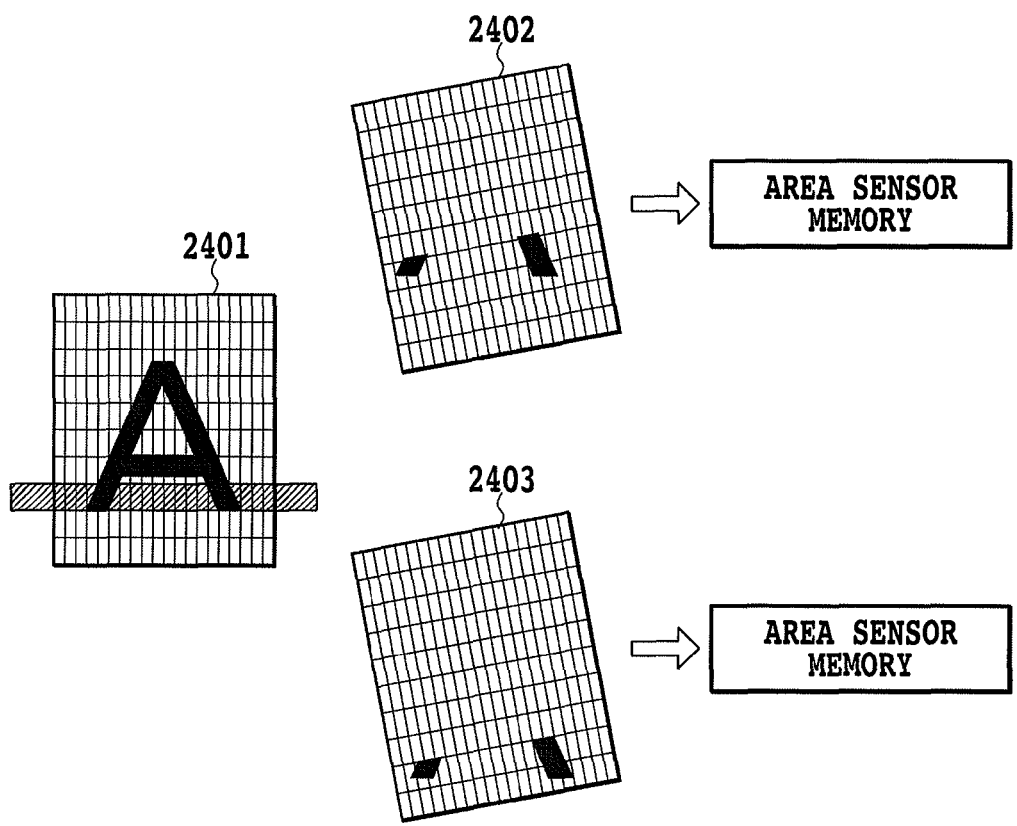
FIG. 24 is a diagram of the method for acquiring line image data of the obliquely mounted area sensor according to the embodiment of the present invention.

Furthermore, when the scanner 104 moves further in the subscan direction, the light source moves, and positions indicated by a shaded portion of symbol 2401 in FIG. 24 are read, and the line sensors 1403 and 1404 detect sets of image data indicated by symbols 2402 and 2403 in FIG. 24. These sets of image data are respectively stored in the area sensor memory or other memory medium.

Figure 25:
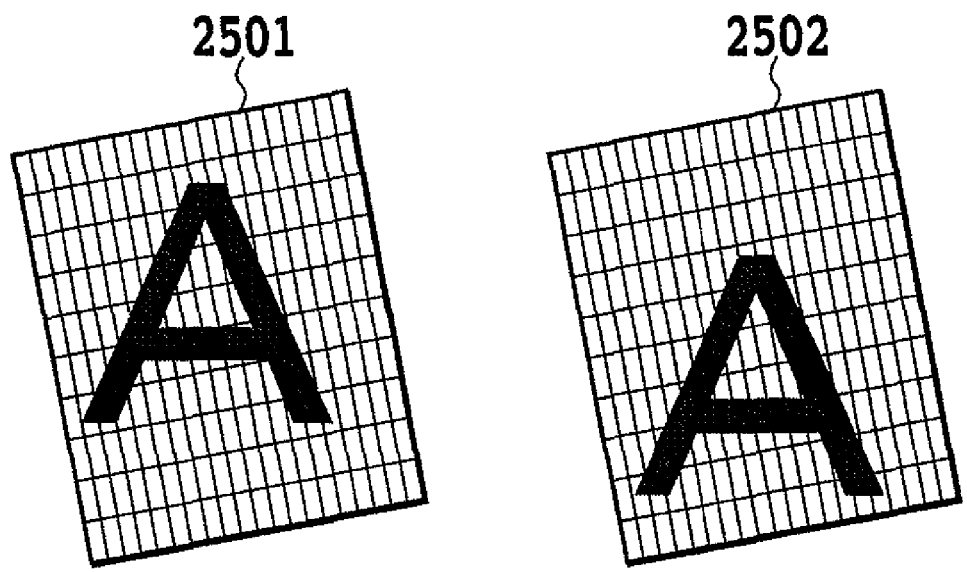
FIG. 25 is a diagram of image data read by a line sensor in the obliquely mounted area sensor according to the embodiment of the present invention.

In a final stage, the sets of image data detected and read by the line sensors 1403 and 1404 are the sets of data such as indicated by symbols 2501 and 2502 in FIG. 25 and are both read as sets of image data inclined by the angle θ.

As shown in FIG. 21, the line sensor 1403 and the line sensor 1404 are physically shifted in the subscan direction by an amount corresponding to one pixel sensor. There is thus a phase shift in the horizontal direction between the pixel sensors making up the line sensor 1403 and the pixel sensors making up the line sensor 1404. For example, the positions in the y-axis direction of the pixel sensor positioned at the coordinates: (x, y)=(15, 4) of the line sensor 1403 and the pixel sensor positioned at the coordinates: (x, y)=(15, 5) of the line sensor 1404 are shifted by y=1. This shift brings about a shift of Δβ in the subscan direction.

Meanwhile, the positions in the x-axis direction are completely the same with x=15. However, due to the inclination angle θ, there is a phase shift of just a minute amount Δα within a subpixel with respect to the horizontal direction, which is the main scan direction before inclination of the entire area sensor.

Specifically, even between pixel sensors of the same position in the x axis direction in the reading line sensor, a phase shift of a minute unit that depends on the inclination angle is generated in the horizontal direction that is the main scan direction due to the inclining of the area sensor. Therefore, the sets of image data read by the reading line sensors defined in the area sensor thus become sets of image data that differ in phase shift according to the line sensors that are the same in resolution.

Specifically, the set of read image data indicated by symbol 2501 in FIG. 18 and the set of read image data indicated by symbol 2502 in FIG. 18 are shifted not only by Δβ in the subscan direction but are shifted in phase by just Δα in the main scan direction as well.

Although the above description is premised on the reading line sensors (line sensors 1403 and 1404), the present invention is not restricted thereto.

A plurality of reading line sensors may be configured by increasing the number of pixel sensors making up the area sensor in the x-axis direction. That is, the maximum number of the reading line sensors becomes the number of pixels aligned in the x-axis direction that make up the area sensor 1401.

The number of reading line sensors configured is equal to the number of sets of read image data obtained in a single reading operation. That is, if reading line sensors for 30 lines are configured in the area sensor 1401, 30 read images that differ in phase shift can be obtained in a single reading control.

By inclining the area sensor, sets of image data corresponding to a plurality of images, with which the shift in the main scan direction is less than one pixel, can be obtained as the image data of a plurality of lines that are adjacent in the subscan direction and corresponding to the document image in a single scan of the document image.

When pixel sensors are thus positioned in two-dimensions and used as an area sensor for reading an image, a plurality of images that are successively shifted in phase in the subscan direction and the main scan direction can be obtained in a single reading operation. The image processing unit 105 can perform super-resolution processing by the method described using FIGS. 21 to 25 based on the plurality of sets of image data thus obtained.

Symbols 106 and 107 indicate paper fingerprint reading units, and each is configured from the above-described CMOS area sensor to pick up a specific portion of a sheet and generate paper fingerprint information, which is characteristic data unique to the paper. Symbol 108 indicates a system bus to which the CPU 101, the memory 102, the image processing unit 105, the printer 103, and the scanner 104 are connected.

Here, a "paper fingerprint" is a minute pattern unique to a sheet that is generated in a paper making process or other process of manufacturing the sheet. A fiber pattern of a sheet, which is disclosed in Patent Document 3 and Patent Document 4, and likewise, a surface state (microscopic unevenness of the sheet surface), thickness non-uniformity, etc., of the sheet, which are disclosed in Patent Document 5, are examples of a "paper fingerprint." As indicated in these documents, a paper fingerprint varies diversely due to random factors occurring within a complex paper manufacturing process and it is considered extremely difficult to duplicate paper having the same paper fingerprint. A paper fingerprint is seen not only in pulp paper but is seen generally in synthetic fiber paper, nonwoven fabric, and other products produced by performing processing similar to a paper manufacturing process with regard to fiber. Thus, "sheet" in the present specification is not restricted to pulp paper and refers generally to any object on which a paper fingerprint may be formed. Because the paper fingerprint is thus information unique to a sheet and can be used to specify the sheet, the paper fingerprint information serves as identification information unique to the sheet.

Figure 2:
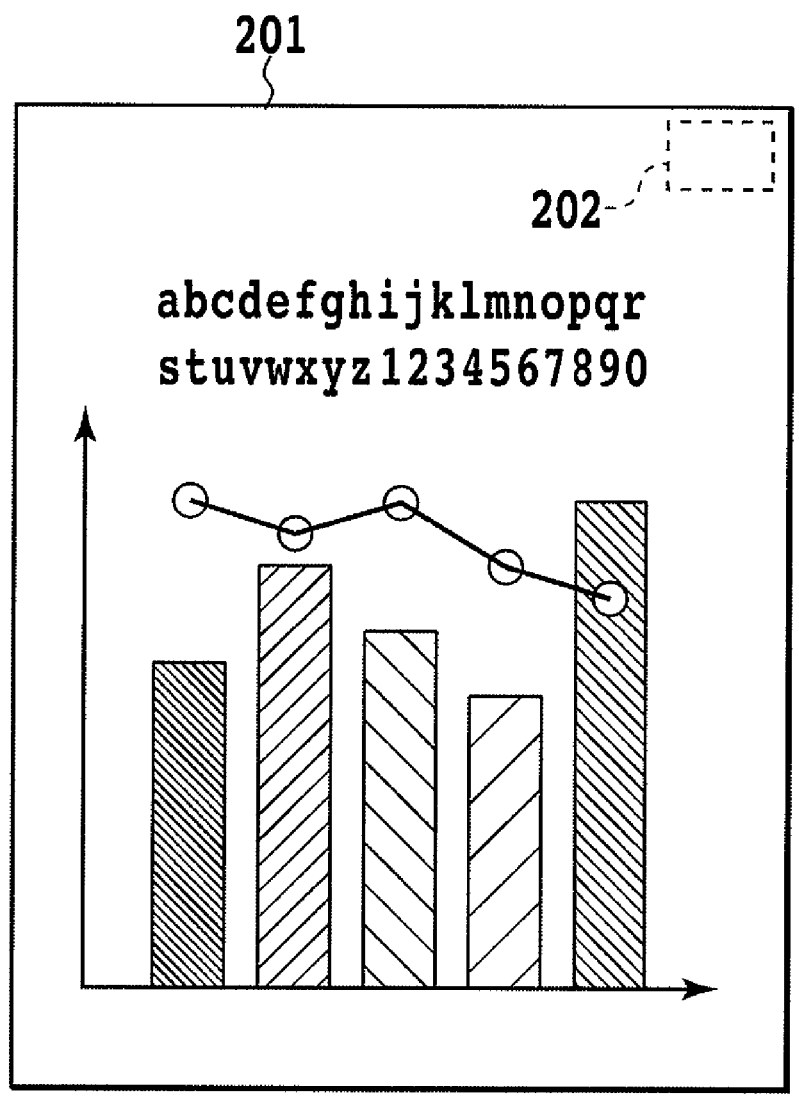
FIG. 2 is a diagram of a paper fingerprint information acquisition region in a sheet according to the embodiment of the present invention.

FIG. 2 is a diagram of a paper fingerprint reading region in a sheet.

Microscopically, the paper fingerprint differs according to location even within the single sheet 201. The fingerprint reading units 106 and 107 must thus always read the paper fingerprint from a determined region 202. The paper fingerprint reading unit 106 is installed inside the scanner, reads the paper finger print of the sheet that is to be the document, and generates paper fingerprint information. Also, the paper fingerprint reading unit 107 is installed inside the printer, reads the paper fingerprint of the recording sheet, and generates paper fingerprint information.

Specifically, each of the paper fingerprint reading units 106 and 107 acquires the region 202 of the sheet 201 as image data by a sensor and generates the paper fingerprint information based on the acquired image data.

Also, in the present embodiment, the paper fingerprint information is generated based on the image data acquired by the paper fingerprint reading unit 106 or 107, arrangements may be made so that a paper fingerprint information acquiring process is performed by the image processing unit 105. In this case, the image processing unit 105 acquires image data concerning a predetermined region of image data acquired by the scanner 104 and acquires the paper fingerprint information based on the image data of the predetermined region.

Figure 3:
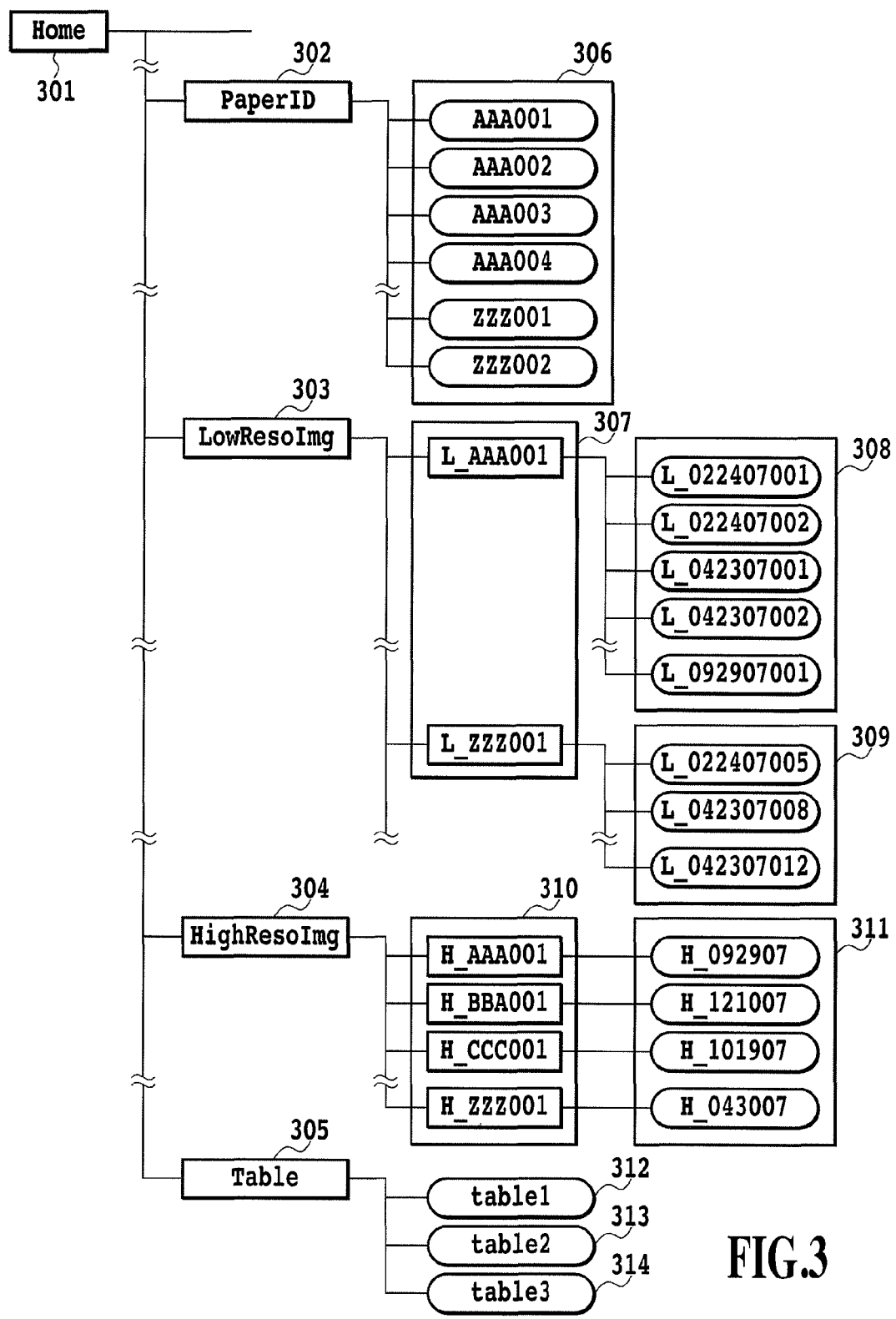
FIG. 3 is a diagram for describing a data hierarchy in a memory in the embodiment of the present invention.

FIG. 3 is a diagram of a data hierarchy in the memory 102 for the data handled in the present embodiment.

Symbol 301 indicates a Home directory. A PaperID directory 302, a LowResoImg directory 303, a HighResoImg directory 304, and a Table directory 305 exist under the Home directory 301.

The PaperID directory 302 stores paper fingerprint information 306, which has been generated by the paper fingerprint reading unit 106 or 107 and is characteristic data unique to a sheet.

A plurality of directories 307 exist inside the Low ResoImg directory 303. Image data sets 308 and 309, read by the scanner 104, are stored in the respective directories. The image data sets 308 and 309 are stored, for example, in a bitmap format. The image data sets 308 and 309 are sets of image data (also referred to as "read image data") that have been generated by the reading operation by the scanner 104 and correspond to being the low-resolution images in the sense that these are the image data sets that serve as the basis for generating a high-resolution image when the super-resolution processing is performed later.

A plurality of directories 310 exist inside the HighResoImg directory 304. In each of these directories, a single image data set 311 is stored. The image data set 311 is generated by the super-resolution processing by the image processing unit 105 and is stored, for example, in the bitmap format.

A paper fingerprint management table 312, a low-resolution image management table 313, and a high-resolution image management table 314 exist inside the Table directory 305.

The directories 302, 303, 304, 305, 307, and 310 and the image data sets 308, 309, and 311 shall be described later. Also, the paper fingerprint management table 312, the low-resolution image management table 313, and the high-resolution image management table 314 shall be described in more detail later.

In the present embodiment, the paper fingerprint information, which is identification information unique to a sheet, and added information are stored in an associated manner in the memory 102, which is a memory. The added information includes information indicating whether the read document sheet is an original or a copy (attribute information), information indicating a storage location of the read image data, information concerning an image quality of a subject image, and information indicating a storage location of image data after super-resolution processing (high-resolution image data).

That is, in the present embodiment, the paper fingerprint information and the added information are managed in an associated manner as management information by the paper fingerprint management table 312, the low-resolution image management table 313, and the high-resolution image management table 314.

Also, a case where image quality level information is used as the information concerning the image quality of the subject image in the present embodiment shall now be described.

FIG. 4 is a conceptual diagram that illustrates a concept of the paper fingerprint management table 312.

The paper fingerprint management table 312 is a table file in which the paper fingerprint information 306 inside the ID directory 302 is associated with the added information 410.

Each paper fingerprint information generated by the paper fingerprint reading unit 106 or 107 is provided with a unique ID (file name) and stored under the ID directory. As shown by the paper fingerprint information 306 in FIG. 3, the IDs in the present embodiment are, for example, "AAA001," "AAA002," and "AAA003." A paper fingerprint ID 402 in the paper fingerprint management table 312 refers to this ID.

The added information 401 includes the attribute information 403, low-resolution image path information 404, which is the information indicating the storage location of the read image data, high-resolution image path information 405, which is the information indicating the storage location of the image data after super-resolution processing, and image quality level information 406. The attribute information 403 expresses whether the sheet placed on the platen is an original document or a copied document. The low-resolution image path information 404 designates a directory in which read image data are stored when the sheet having the paper fingerprint ID is read by the scanner 104. The high-resolution image path information 405 designates a directory for storing high-resolution image data, such as those of an image that has been super-resolution processed using a plurality of images stored in the LowResoImg directory 303. The imag equality level information 406 expresses the image quality of an image that is printed on the sheet. The image quality level information is of five levels from level 1 to level 5 and is used to judge the image quality level of the sheet. In the present embodiment, level 1 is the best and the image quality degrades in the order of: level 2, level 3, level 4, and level 5. A level determination method for the image quality level information 406 shall be described in detail later.

FIG. 5 is a conceptual diagram that illustrates a concept of the low-resolution image management table 313.

The low-resolution image management table 313 is for storing an image, read by the scanner 104, in association with the image quality level of the document and a data/time of the reading. The document image data (read image data) read by the scanner 104 are stored under a directory designated by the low-resolution image path information 404 that is associated with the paper fingerprint ID unique to the sheet of the document by the paper fingerprint management table 312.

Directory information 501 is the same as the low-resolution image path information 404. Imag equality level information 503 indicates the image quality level of the document read by the scanner 104. Also, as shall be described below, in a case where the low-resolution image management table 313 is renewed in a case where the paper fingerprint information of the read document is registered, the image quality level information 503 indicates the renewed image quality level. Reading date/time information 504 is information on the date/time at which the document image was read by the scanner 104. Thus, when the scanner 104 reads a document image, the CPU 101 references a clock (not shown) connected to the system bus 108 and acquires the date/time at which the reading was performed. Then, the acquired date/time are read and registered as the date/time information 504 in the low-resolution image management table 313.

FIG. 6 is a conceptual diagram that illustrates a concept of the high-resolution image management table 314.

The high-resolution image management table 314 is for storing image data, generated by performing the super-resolution processing by the image processing unit 105, in association with the image quality level and the date/time of data generation.

Directory information 601 is image path information indicating where the image data, generated by performing the super-resolution processing, are stored. An Image ID 602 is a file name of the image data. Image quality level information 603 is the image quality level information of the image generated by the super-resolution processing. Generation date/time information 604 expresses the date/time of generation of the image information generated by the super-resolution processing. Thus, when the super-resolution processing is performed by the image processing unit 105, the CPU 101 references the clock and acquires the date/time at which the reading was performed, and registers the acquired date/time as the generation date/time information 604 in the high-resolution image management table 314.

Figure 7:
FIG. 7 is a diagram of image quality levels handled by the multifunction apparatus to which the embodiment of the present invention is applied.

FIG. 7 is a diagram of relationships of the image quality levels and general descriptions of images applicable to the respective levels as handled in the multifunction apparatus according to the present embodiment.

As mentioned above, the imag equality level is defined according to five levels in the present embodiment. Level 1 signifies the best image quality, and an applicable image is an original document (a document that is not copy) as shown in FIG. 7. That is, image quality level 1 is assigned when the document read by the scanner 104 is an original document.

Level 5, which is the image quality level of the lowest image quality, shall now be described. An image to which level 5 is applicable is a copy (grandchild copy) of the original document or a copy of the grandchild copy. An image to which level 5 is applicable is not of image data generated by the super-resolution processing. Image quality level 5 is thus assigned when the document to be read by the scanner 104 is a document, on which image data resulting from reading of a copy (grandchild copy) of an original document by the scanner and that have not been subject to super-resolution processing are formed.

Before describing level 2, level 3, and level 4, the super-resolution processing in the present invention shall be described.

As mentioned above, a plurality of image data having mutually different phase shifts are required for the super-resolution processing. In the multifunction apparatus of the present invention, the phase shift makes use of a mechanical reading position precision error that the scanner 104 has. That is, when the same document is read a plurality of times by the scanner 104, all of the read image data will have phase differences of amounts corresponding to just the mechanical reading position precision error. Here, the mechanical reading position precision error is suppressed to less than a single pixel. However, this phase shift cannot be controlled by the CPU 101. Thus, in performing the super-resolution processing using the read image data, it can be said that the image quality of the generated high-resolution image becomes higher the larger the number of sets of read image data subject to processing. However, the read image data are stored as bitmap data in the memory 102 as mentioned above and image data in excess of a memory capacity of the memory 102 cannot be stored. Thus, as a multifunction apparatus, a limit must be set in regard to the number of sets of low-resolution image data, to be subject to the super-resolution processing, that are stored with respect to a single original document. In the present embodiment, this number of sets is set to 50.

Although the upper limit of the stored number of sets of low-resolution image data is set to 50 in the present embodiment, the present invention is not restricted to this number.

As shown in the table of FIG. 7, image data to which level 4, among the image quality levels of the present embodiment, is applicable are high-resolution image data generated as a result of performing the super-resolution processing using not less than 2 and not more than 20 sets of read image data. Also, as shown in the table of FIG. 7, image data to which level 3 is applicable are high-resolution image data generated as a result of performing the super-resolution processing using not less than 21 and not more than 40 sets of read image data. Further, as shown in the table of FIG. 7, image data to which level 2 is applicable are high-resolution image data generated as a result of performing the super-resolution processing using not less than 41 and not more than 50 sets of read image data which are the upper limit of the stored number of sets. It can thus be said that the image quality level information is equivalent to the number of sets of source image data used in the super-resolution processing.

Figure 8:
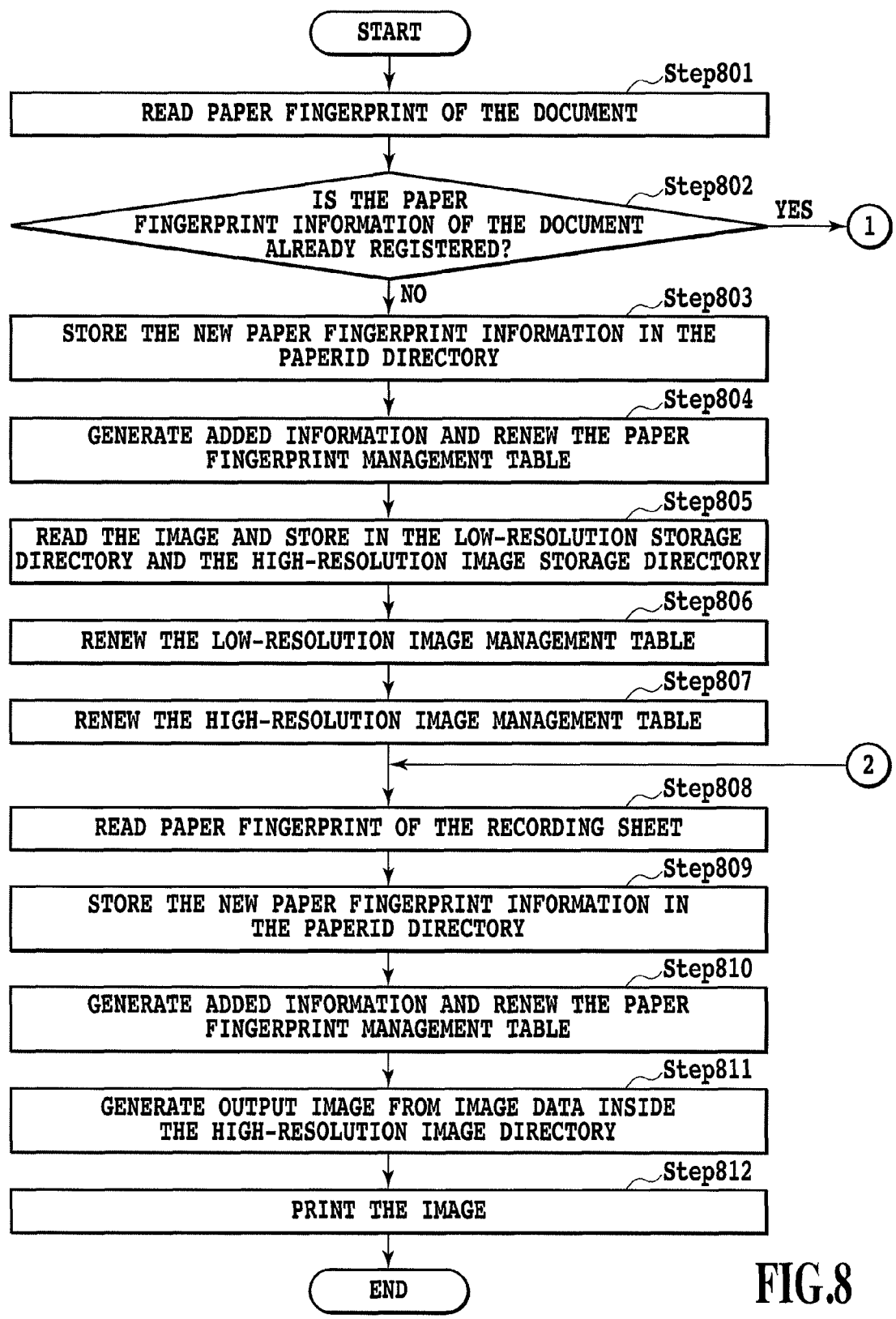
FIG. 8 is a flowchart for describing a copy operation flow of the embodiment of the present invention.
Figure 9:
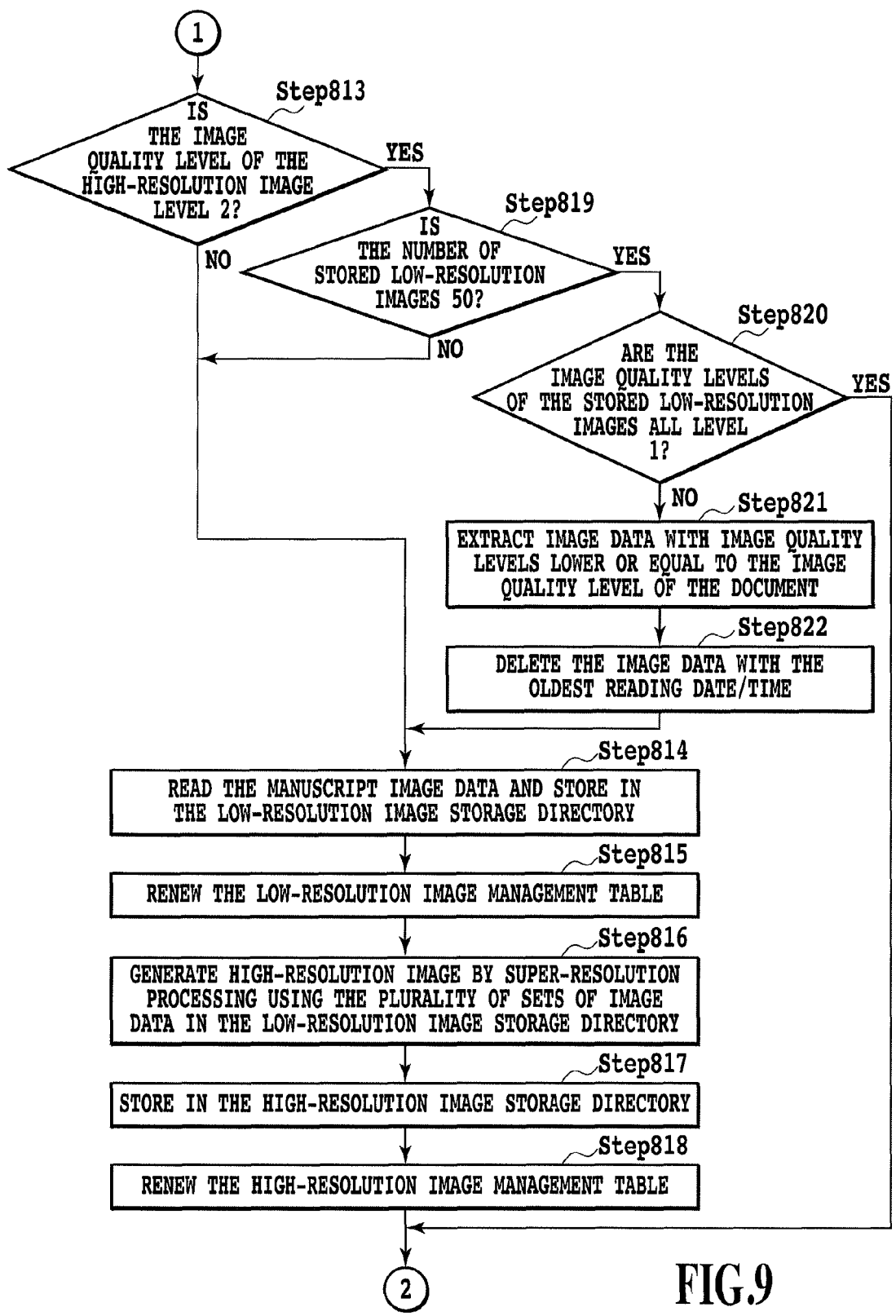
FIG. 9 is a flowchart for describing the copy operation flow of the embodiment of the present invention.

Next, a copy operation in the multifunction apparatus according to the present invention shall now be described in detail using flowcharts shown in FIGS. 8 and 9. The CPU 101 reads a control program, shown in FIGS. 8 and 9, from the ROM and executes the control program.

First, an operation in a case where an original paper document is copied for the first time by the multifunction apparatus according to the present embodiment shall be described.

When an operator places a document to be copied on the platen and inputs a copy operation instruction into the multifunction apparatus from an unillustrated operating unit, the CPU 101 accepts the user input and makes the scanner 104 perform reading of the paper fingerprint of the document. That is, the CPU 101 transmits a command instructing the reading of the paper fingerprint of the document to the scanner 104. Upon receiving the command, the paper fingerprint reading unit 106 inside the scanner 104 reads the paper fingerprint of the document and generates the paper fingerprint information (step 801).

In step 802, the CPU 101 references the paper fingerprint management table 312 as management information and judges whether or not the paper fingerprint information read in step 801 is already stored in the PaperID directory 302. At this point, the document read by the scanner 104 is an original for which the copy operation is performed for the first time by the multifunction apparatus. Therefore, the same paper fingerprint information is not stored in the apparatus and step 803 is entered.

In step 803, the CPU 101 stores the paper fingerprint information, read in step 801, in the PaperID directory 302.

In step 804, the added information 401 is generated for the document that is currently about to be read by the scanner and the paper fingerprint management table 312 is renewed.

The added Information 401 in step 804 shall now be described. As mentioned above, because the document is an original paper document, the attribute information 403 is set to "original" ("org"). That is, because in step 802, the paper fingerprint of the document currently positioned on the platen is not managed by any of the tables in the memory 102, the CPU judges the document as being copied for the first time and thus to be an original and thus sets the attribute information to "original."

In regard to the low-resolution image path information 404, the CPU 101 prepares a new directory under the LowResoImg directory 303 and sets this as the hierarchy path. In regard to the high-resolution image path information 405, the CPU 101 prepares a new directory under the HighResoImg directory 304 and sets this as the hierarchy path. Furthermore, in regard to the image quality level information 406, the CPU 101 sets the image quality level to level 1 because an original paper document was read.

Next, in step 805, the CPU 101 makes the scanner 104 perform reading of the document image. That is, the CPU 101 transmits a command instructing reading of the document image to the scanner 104, and when the scanner 104 receives the command, the scanner 104 optically reads the document image. The document image data that have been read (read image data) are subject to a series of scanner-related image processing by the image processing unit 105. Then, in accordance with the directory designated by the low-resolution image path information 404 generated in step 804 and the directory designated by the high-resolution image path information 405, the CPU 101 stores the read image data, to which the predetermined processing has been applied, in the predetermined location in the memory 102. That is, the read image data are stored as high-resolution image data in the directory designated by the high-resolution image path information 405.

Next, in step 806, the CPU 101 performs renewal of the low-resolution image management table 313. As the directory information 501, the low-resolution image path information 404, used in renewing the paper fingerprint management table 312 in step 804, is used. As the image ID 502, the file name of the image data used in storing the image in the directory in step 805 is used. As the image quality level information 503, the image quality level information 406, used in renewing the paper fingerprint management table 312 in step 804, is used. At this point, the image quality level is level 1.

Next, in step 807, the CPU 101 performs renewal of the high-resolution image management table 314. As the directory information 601, the high-resolution image path information 405, used in renewing the paper fingerprint management table 312 in step 804, is used. As the image ID 602, the file name of the image data used in storing the image in the directory in step 805 is used. Because the image data to be printed with respect to the image reading in step 805 are image data read by the scanner 104, the image quality level information 603 is set to the lowest level 5.

Next, the CPU 101 then makes the printer 103 perform reading of the paper fingerprint of a recording sheet (recording medium) for forming an image. That is, the CPU 101 transmits a command instructing the reading of the paper fingerprint of the recording sheet to the printer 103. When the printer 103 receives the command, the fingerprint reading unit 107 disposed inside the printer 103 reads the paper fingerprint of the recording sheet and generates the paper fingerprint information (step 808).

In step 809, the CPU 101 stores the paper fingerprint information of the recording sheet, read by the paper fingerprint reading unit 107 in step 808, in the PaperID directory 302.

In step 810, the CPU 101 generates the added information 401 for the recording sheet, the paper fingerprint of which has been read in step 808, and renews the paper fingerprint management table 312.

The added information 401 in step 810 shall now be described. Because at this point, copied image data are to be printed on the recording sheet, the attribute information 403 is set to "copy." Thus, from hereon, when the present recording sheet is to be copied, because the paper fingerprint information of the recording sheet and the attribute information 403 are managed in an associated manner in the present multifunction apparatus, the multifunction apparatus can recognize that the recording sheet is not an original but a copy made by copying over some generations.

In regard to the low-resolution image path information 404, the CPU 101 uses the low-resolution image path information 404 used in the renewal previous to the renewal in the present step. In regard to the high-resolution image path information 405, the CPU 101 uses the high-resolution image path information 405 used in the renewal previous to the renewal in the present step. Furthermore, in regard to the image quality level information 406, the CPU 101 uses the image quality level set in the renewal of the high-resolution image management table 314 previous to the renewal in the present step. That is, the image quality level of the image data placed under the directory designated by the high-resolution image path information 405 is used.

In the present description, an operation in a case where an original paper document is being copied by the present multifunction apparatus for the first time (the case where the "NO" judgment is made in step 802) is described. Renewal using the low-resolution image path information 404 and the high-resolution image path information 405 used in the renewal of the paper fingerprint management table 312 in step 804 is thus performed. Furthermore, renewal is performed using the image quality level information 603 set in step 807.

In the present embodiment, the super-resolution processing, which is a process for achieving high image quality in copying after the copy that is currently being output, is controlled by referencing the added information associated with the paper fingerprint information. The added information thus includes the information on the image to be formed on the recording sheet that is currently about to be printed on (the image formed on the copy that is currently being output).

Next, the CPU 101 uses the image data placed under the directory designated by the high-resolution image path used in step 810 to perform a series of printing-related image processing at the image processing unit 105 and generates printing image data (step 811). Based on the printing image data generated in step 811, the CPU 101 prints the image on the recording sheet (on the recording medium), from which the paper fingerprint information was extracted in step 808, at the printer 103 in step 812 for recording.

Thus, in the present embodiment, the multifunction apparatus references the paper fingerprint management table 312 and, in a case where the paper fingerprint information concerning the document that is currently about to be copied is not managed, newly generates the added information concerning the document. Next, first management information (paper fingerprint management table, low-resolution image management table, and high-resolution image management table) associating the added information and the paper fingerprint information is then generated and the document image is stored in the predetermined location in the memory 102 in accordance with the management information. The stored document image is generated as the output image and the copy is output by performing image forming on the recording sheet based on the output image. In this process, the paper fingerprint information of the recording sheet is acquired, and second management information, associating the added information concerning the copy output onto the recording sheet by the current copying and the paper fingerprint information of the recording sheet, is generated and stored in the memory 102.

In the present embodiment, because in regard to the child copy of the original, the second management information is generated during the output of the copy, a copy (grandchild copy) generated by performing the super-resolution processing in accordance with the management information can be output when the child copy is copied the next time. Thus, even in performing the grandchild copying, the image quality of the grandchild copy can be improved.

Next, an operation in a case where a sheet, for which the paper fingerprint information is already managed by the multifunction apparatus according to the present embodiment, is copied as a document (when the "YES" judgment is made in step 802) shall now be described.

When the operator places the document on the platen and instructs the copy operation to the multifunction apparatus from the unillustrated operating unit, the CPU 101 makes the scanner 104 acquire the paper fingerprint information. That is, in accordance with the instruction from the CPU 101, the paper fingerprint reading unit 106 inside the scanner 104 reads the paper fingerprint information of the document (step 801).

The CPU 101 references the paper fingerprint management table 312 and judges whether or not the paper fingerprint information read in step 801 is already stored in the PaperID directory 302 (step 802). Because at this point, the paper fingerprint information is already stored in the memory 102 as mentioned above, step 813 in FIG. 9 is entered.

In step 813, first, the CPU 101 determines, from the paper fingerprint management table 312, the image quality level, the low-resolution image path, and the high-resolution image path associated with the paper fingerprint information of the document read in step 801. Next, the CPU 101 references the high-resolution image management table 314 and judges the image quality level of the high-resolution image data stored under the directory designated by the high-resolution image path. If the image quality level is a level besides level 2, step 814 is entered.

Next, in step 814, the CPU 101 makes the scanner 104 perform reading of the document image. That is, the scanner 104 optically reads the document image. The document image data that have been read are subject to the series of scanner-related image processing by the image processing unit 105 and the read image data are stored in the predetermined location in the memory 102 in accordance with the directory designated by the low-resolution image path determined in step 813.

Next, in step 815, the CPU 101 performs renewal of the low-resolution image management table 313. As the directory information 501, the low-resolution image path information 404 determined in step 813 is used. As the image ID 502, the file name of the image data is used. As the image quality level information 503, the image quality level information 406 of the document image determined in step 813 is used.

Next, in step 816, the CPU 101 uses all of the low-resolution image data stored under the directory designated by the low-resolution image path determined in step 813 to perform the super-resolution processing at the image processing unit 105 and thereby generates high-resolution image data.

Thus, with the present embodiment, for a document that has been read once, the paper fingerprint information and the added information of the document are managed in an associated manner, and under this management, the sets of read image data (low-resolution image data), generated each time the document is read, are stored in the memory 102. Thus, when the document that is currently being read is a copy, the super-resolution processing can be performed using the low-resolution image data that had been acquired up to the previous copying. Thus, in regard to a certain document, the number of low-resolution image data sets increases each time copying is performed and the image quality of the high-resolution image data generated by the super-resolution processing can be improved each time copying is performed. That is, because the low-resolution images to be used in the super-resolution processing are accumulated each time copying is performed, the image data generated by the super-resolution processing can be made higher in image quality each time copying is performed.

Next, the CPU 101 stores the high-resolution image data, in step 816, under the directory designated by the high-resolution image path determined in step 813 (step 817).

Next, in step 818, the CPU 101 performs renewal of the high-resolution image management table 314. As the directory information 601, the high-resolution image path information 405 determined in step 813 is used. As the image ID 602, the file name of the image data used in storing the image in the directory is used. In regard to the image quality level 603, the image quality level is determined and set in accordance with the criteria described using FIG. 7. That is, the CPU 101 acquires the number of sets of low-resolution image data used to perform the super-resolution processing in step 916 and determines the image quality level in accordance with the number of sets.

In regard to the flow from step 808 onward, because a description has been given already, only relevant portions shall be described.

The above-described processes are performed in steps 808 and 809.

Next, in step 810, the CPU 101 generates the added information 401 for the recording sheet, the paper fingerprint of which has been read in step 808, and renews the paper fingerprint management table 312.

The added information 401 in step 810 shall now be described. Because at this point, copied image data are to be printed on the recording sheet, the attribute information 403 is set to "copy." In regard to the low-resolution image path information 404, the CPU 101 uses the low-resolution image path information used in the renewal of the low-resolution image management table 313 in step 815 that is the renewal previous to the renewal in the present step. In regard to the high-resolution image path information 405, the CPU 101 uses the high-resolution image path information used in the renewal of the high-resolution image management table 314 in step 818 that is the renewal previous to the renewal in the present step. Furthermore, in regard to the image quality level information 406, the image quality level, set in the renewal of the high-resolution image management table 314 in step 818 that is the renewal previous to the renewal in the present step, is used.

Steps 811 and 812 are performed in the same manner as described above.

Next, the flow n a case where the image quality level in the judgment of the image quality level of the high-resolution image data in step 813 is level 2 shall be described. In this case, step 819 is entered.

In step 819, the CPU 101 judges whether or not the number of sets of image data stored in the directory, designated by the low-resolution image path determined in step 813, has reached the upper limit value of 50. If the upper limit value has not been reached, step 814 is entered and because the flow from there onward has been described already, description thereof shall be omitted.

If in the judgment in step 819, it is judged that the upper limit value has been reached, step 820 is entered. In step 820, the CPU 101 judges whether or not the image quality levels of all sets of image data stored in the directory, designated by the low-resolution image path determined in step 813, are level 1. If all of the image quality levels are level 1, because further improvement of the image quality cannot be anticipated by the super-resolution processing, step 808 is entered without reading document image data a new and further without performing the super-resolution processing. Because the flow from step 808 onward has been described already, description thereof shall be omitted.

If in step 820, the CPU 101 judges that the image quality levels of all sets of image data stored in the directory, designated by the low-resolution image path determined in step 813, are not level 1, step 821 is entered.

In step 821, the CPU 101 extracts, from among the image data stored under the directory designated by the low-resolution image path determined in step 813, the image data having the same image quality level as or a lower image quality level than the image quality level of the document that is currently being read.

Next, the CPU 101 references the low-resolution image management table 313 and deletes, from among the image data extracted in step 821, the image data of the oldest reading date/time (step 822). Step 814 is then entered, and because the flow from here onward has been described already, description thereof shall be omitted.

Thus, with the present embodiment, the low-resolution image data that had been acquired up to now are saved in the multifunction apparatus and the high-resolution image data, prepared by the super-resolution processing using the currently read image data and the low-resolution image data that had been acquired up to now, are used as the image data for output. The low-resolution image data that are to be the material for the super-resolution processing performed on the document that is currently being read are stored in the memory 102 that is the memory and the corresponding low-resolution image data can be acquired using the paper fingerprint information. Thus, even if the document that is currently being read is an N-th generation copy, such as a child copy or a grandchild copy, the low-resolution image data for the copy can be extracted to apply the super-resolution processing and generate high-resolution image data, and high-quality printing can thus be performed even in the case of N-th generation copying.

As described above, with the present embodiment, each individual sheet is identified and each individual sheet is managed in association with the added information. Furthermore, with the present embodiment, by using the document image data that are read and the image data that had been read from the same document previously to perform the super-resolution processing, a copy of an image quality that can be obtained at a resolution not less than the resolution of the scanner or other reading device can be provided.

Furthermore, by including the information indicating the image quality level in the added information, effects of optimizing the memory capacity used in the equipment and reducing the load of the multifunction apparatus system can be provided.

Second Embodiment

In the first embodiment, identification of the sheet is performed using the paper fingerprint that the sheet has uniquely. With this example, all of the information must be held inside the multifunction apparatus.

Meanwhile, arts of ID elements that transmit information in a non-contacting manner by electromagnetic induction (RFID: Radio Frequency Identification) have been developed and are beginning to be applied to identification and management of objects. As an application example of this, attachment of an RFID tag, capable of transmission and reception by wireless communication, to a recording medium of a copier is proposed in Patent Document 6. According to this proposition, a recording sheet itself can be made to hold the added information of the image data printed on the recording sheet.

Figure 10:
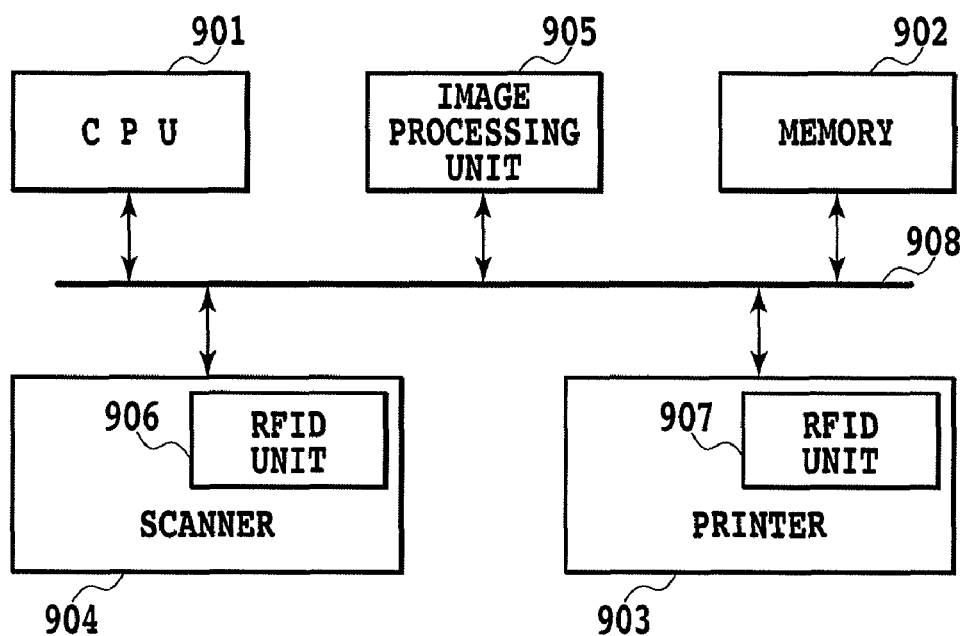
FIG. 10 is a diagram of a configuration of a multifunction apparatus according to an embodiment of the present invention.

FIG. 10 is a schematic diagram of process blocks for handling an image in a multifunction apparatus according to the present embodiment.

Based on a control program, etc., stored in an unillustrated ROM, a CPU 901 performs overall control of access to various connected devices and performs overall control of various data processing inside the multifunction apparatus. A memory 902 is a hard disk drive or other large-scale memory and is capable of storing a system software and image data. Symbol 903 indicates a printer that is configured with a recording engine, for example, of an ink jet type or an electronic photography type.

A scanner 904 optically reads a document placed on a platen and performs conversion of the document to electronic data. Symbol 905 indicates an image processing unit that applies various image processing on the image data read by the scanner 904. A process block that performs super-resolution processing is also included as a portion of a configuration of the image processing unit 905. Symbols 906 and 907 indicate RFID units that perform reading of data from an RFID tag provided in a recording sheet and writing of data into the RFID. In the present specification, the information read from the RFID tag shall be referred to as "sheet ID information." Symbol 908 indicates a system bus to which the CPU 901, the memory 902, the image processing unit 905, the printer 903, and the scanner 904 are connected.

Figure 11:
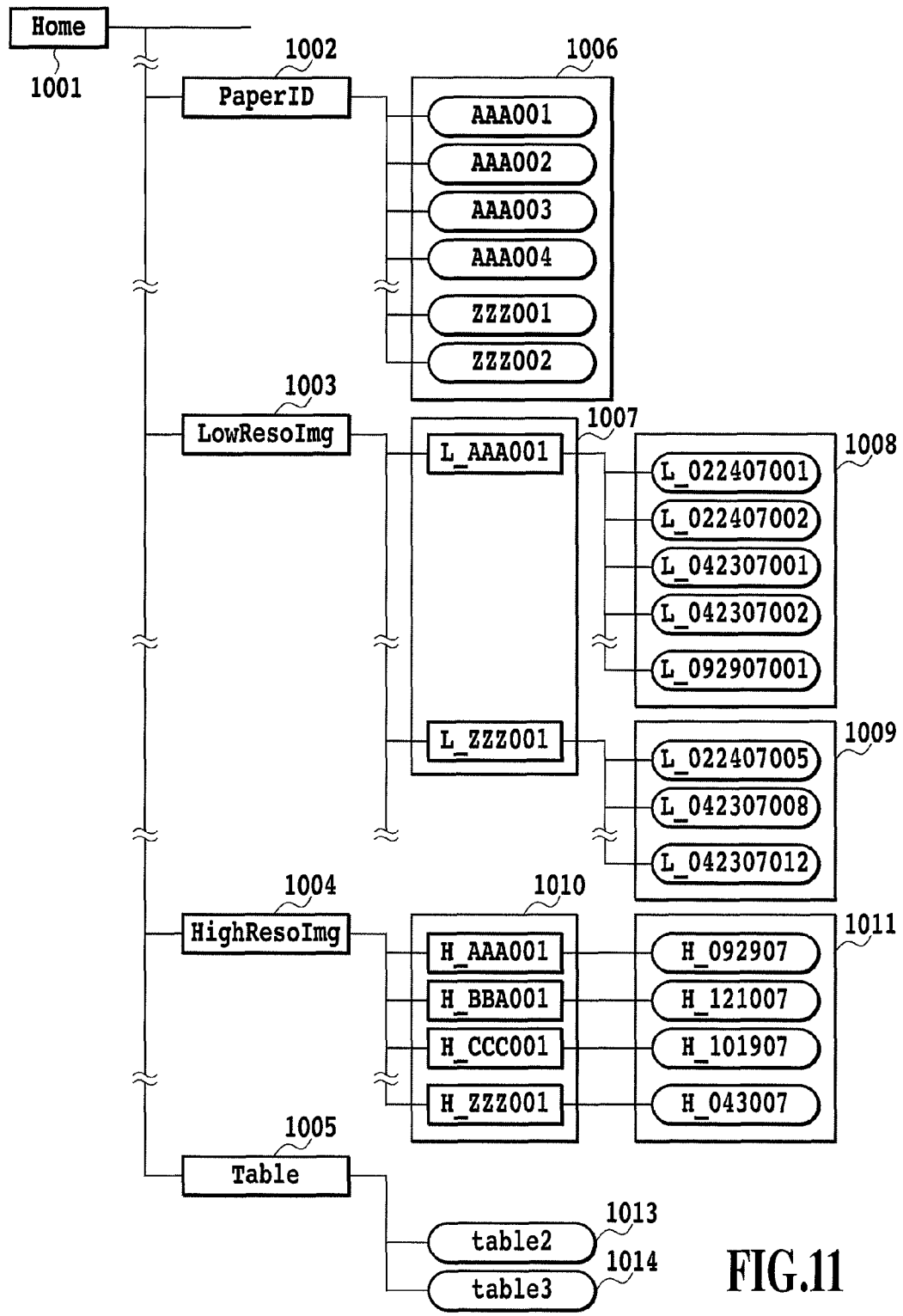
FIG. 11 is a diagram for describing a data hierarchy in a memory in the embodiment of the present invention.

FIG. 11 is a diagram of a data hierarchy in the memory 902 for the data handled in the present embodiment.

Symbol 1001 indicates a Home directory. A PaperID directory 1002, a LowResoImg directory 1003, a HighResoImg directory 1004, and a Table directory 1005 exist under the Home directory 1001.

The PaperID directory 1002 stores the ID unique to a sheet that has been read by the RFID unit 906 or 907.

A plurality of directories 1007 exist inside the LowResoImg directory 1003. Image data sets 1008 and 1009, read by the scanner 904, are stored in the respective directories. The image data sets 1008 and 1009 are stored, for example, in a bitmap format.

A plurality of directories 1010 exist inside the HighResoImg directory 1004. In each of these directories, a single image data set 1011 is stored. The image data set 1011 is generated by the super-resolution processing by the image processing unit 905 and is stored, for example, in the bitmap format.

A low-resolution image management table 1013 and a high-resolution image management table 1014 exist inside the Table directory 1005.

The directories 1002, 1003, 1004, 1005, 1007, and 1010 and the image data sets 1008, 1009, and 1011 are the same as those described with the first embodiment. Furthermore, the low-resolution image management table 1013 and the high-resolution image management table 1014 are the same as those described with the first embodiment.

The image quality level information handled in the second embodiment is also the same as that described with the first embodiment. Also, the added information associated with the ID information unique to a sheet is the same as the added information 401 described with the first embodiment.

Figure 12:
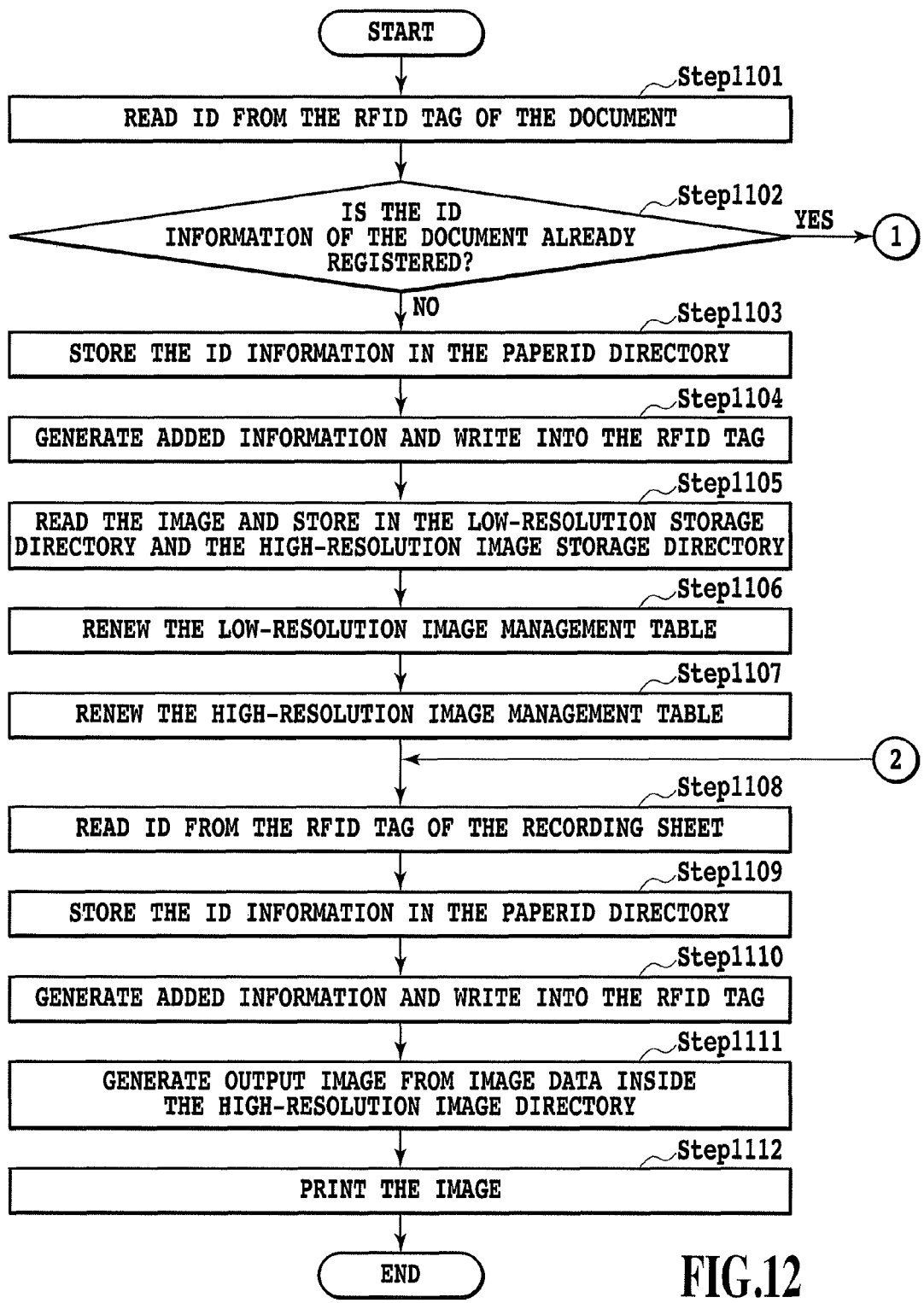
FIG. 12 is a flowchart for describing a copy operation flow of the embodiment of the present invention.
Figure 13:
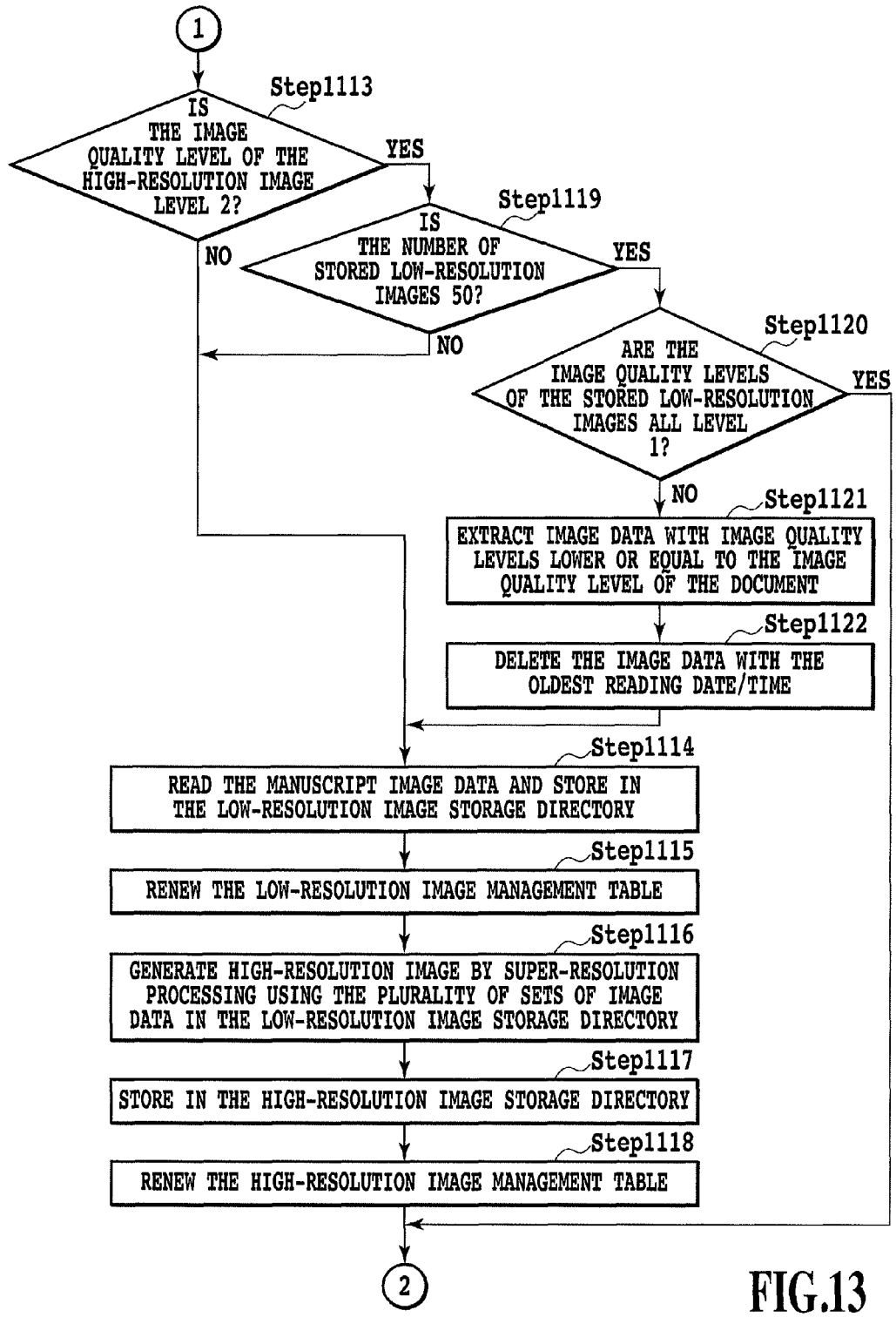
FIG. 13 is a flowchart for describing the copy operation flow of the embodiment of the present invention.

Next, a copy operation in the multifunction apparatus according to the present invention shall now be described in detail using flowcharts shown in FIGS. 12 and 13. The CPU 901 reads a control program, shown in FIGS. 12 and 13, from the ROM and executes the control program.

First, an operation in a case where an original paper document is copied for the first time by the multifunction apparatus according to the present embodiment shall be described.

When an operator places a document to be copied on the platen and instructs a copy operation to the multifunction apparatus from an unillustrated operating unit, the CPU 901 makes the scanner 904 perform an operation of reading an RFID tag added to the document. In this operation, the RFID unit 906 inside the scanner 904 reads the sheet ID information of the document from the RFID tag (step 1101).

The CPU 901 judges whether or not the sheet ID information that has been read is already stored in the PaperID directory 1002 (step 1102). At this point, the document read by the scanner 904 is an original for which the copy operation is performed for the first time by the multifunction apparatus. The same sheet ID information is thus not stored in the apparatus and step 1103 is entered.

In step 1103, the CPU 901 stores the sheet ID information, which has been read, in the PaperID directory 1102.

In step 1104, the CPU 901 generates the added information 401 for the document that is currently about to be read by the scanner 904 and writes the added information into the RFID tag provided in the document. In the present embodiment, the prepared added information 401 is not managed by a paper fingerprint management table but is saved in the RFID tag.

The added information 401 in step 1104 shall now be described. As mentioned above, because the document is an original paper document, the attribute information 403 is set to "original." In regard to the low-resolution image path information 404, the CPU 901 prepares a new directory under the LowResoImg directory 903 and sets this as the hierarchy path. In regard to the high-resolution image path information 405, the CPU 901 prepares a new directory under the HighResoImg directory 904 and sets this as the hierarchy path. Furthermore, in regard to the image quality level information 406, the CPU 901 sets the image quality level to level 1 because an original paper document was read.

Next, in step 1105, the CPU 901 makes the scanner 904 perform reading of the document image. That is, when a document reading instruction is made from the CPU 901, the scanner 904 optically reads the document image, and the document image data that have been read (read image data) are subject to a series of scanner-related image processing by the image processing unit 905. Then, in accordance with the directory designated by the low-resolution image path information 404 generated in step 904 and the directory designated by the high-resolution image path information 405, the CPU 901 stores the read image data in the memory 902.

Next, in step 1106, the CPU 901 performs renewal of the low-resolution image management table 1013. As the directory information 501, the low-resolution image path information 404 included in the added information 401 generated in step 1104 is used. As the image ID 502, the file name of the image data used in storing the image in the directory in step 1105 is used. As the image quality level information 503, the image quality level information 406 used in step 1104 is used. At this point, the image quality level is level 1.

Next, in step 1107, the CPU 901 performs renewal of the high-resolution image management table 914. As the directory information 601, the high-resolution image path information 405 used in step 1104 is used. As the image ID 602, the file name of the image data used in storing the image in the directory in step 1105 is used. The image quality level information 603 is set to the lowest level 5.

The CPU 901 then makes the printer 903 perform reading of the sheet ID information from an RFID tag provided in a recording sheet for forming an image. That is, the CPU 901 transmits a command instructing the reading of the sheet ID information from the RFID tag to the printer 903. When the printer 903 receives the command, the RFID unit 907 disposed inside the printer 903 reads the sheet ID of the recording sheet and obtains the sheet ID information (step 1108).

In step 1109, the CPU 901 stores the sheet ID information of the recording sheet, read by the RFID unit 907, in the PaperID directory 1002.

In step 1110, the CPU 901 generates the added information 401 for the recording sheet, the sheet ID information of which has been read in step 1108, and writes the generated added information 401 into the RFID tag on the recording sheet.

The added information 401 in step 1110 shall now be described. Because at this point, copied image data are to be printed on the recording sheet, the attribute information 403 is set to "copy." In regard to the low-resolution image path information 404, the low-resolution image path information 404 used in step 1104, in which the low-resolution image path information was renewed previously, is used. In regard to the high-resolution image path information 405, the high-resolution image path information 405 used in step 1104, in which the high-resolution image path information was renewed previously, is used. In regard to the image quality level information 406, the image quality level of the image data placed under the directory designated by the high-resolution image path is used.

Next, the CPU 901 uses the image data placed under the directory designated by the high-resolution image path used in step 1110 to perform a series of printing-related image processing at the image processing unit 905 and generates the printing image data (step 1111). Based on the printing image data generated in step 1111, the CPU 901 prints the image on the recording sheet, from which the sheet ID information was extracted in step 1108, at the printer 903 in step 1112 for recording.

An operation in a case where a sheet, for which the sheet ID information is already managed by the multifunction apparatus according to the present embodiment, is copied as a document (when the "YES" judgment is made in step 1102) shall now be described.

When the operator places the document on the platen and instructs the copy operation to the multifunction apparatus from the unillustrated operating unit, the CPU 901 makes the scanner 904 read the sheet ID information. That is, in accordance with the instruction from the CPU 901, the RFID unit 906 inside the scanner 904 reads the sheet ID information of the document (step 1101).

The CPU 901 judges whether or not the sheet ID information acquired in step 1101 is already stored in the PaperID directory 1002 (step 1102). Because at this point, the sheet ID information is already stored in the memory 902 as mentioned above, step 1113 in FIG. 13 is entered.

In step 1113, first, the CPU 901 determines, from the RFID tag on the document sheet, the image quality level, the low-resolution image path, and the high-resolution image path of the document image that is currently about to be read. The image quality level of the high-resolution image data stored under the directory designated by the high-resolution image path is then judged. If the image quality level is a level besides level 2, step 1114 is entered.

Next, in step 1114, the CPU 901 makes the scanner perform reading of the document image. That is, the scanner optically reads the document image. The document image data that have been read are subject to the series of scanner-related image processing by the image processing unit 905 and the read image data are stored in a predetermined location in the memory in accordance with the directory designated by the low-resolution image path determined in step 1113.

Next, in step 1115, the CPU 901 performs renewal of the low-resolution image management table 1013. As the directory information 501, the low-resolution image path information 404 determined in step 1113 is used. As the image ID 502, the file name of the image data is used. As the image quality level information 503, the image quality level information 406 of the document image determined in step 1113 is used.

Next, in step 1116, the CPU 901 uses all of the low-resolution image data stored under the directory designated by the low-resolution image path determined in step 1113 to perform the super-resolution processing at the image processing unit 905 and thereby generates high-resolution image data.

Next, the CPU 901 stores the high-resolution image data, generated in step 1116, under the directory designated by the high-resolution image path determined in step 1113 (step 1117).

Next, in step 1119, the CPU 901 performs renewal of the high-resolution image management table 1014. As the directory information 601, the high-resolution image path information 405 determined in step 1113 is used. As the image ID 602, the file name of the image data used in storing the image in the directory is used. In regard to the image quality level information 603, the image quality level is determined and set in accordance with the criteria described using FIG. 7. That is, the CPU 901 acquires the number of sets of low-resolution image data used to perform the super-resolution processing in step 1116 and determines the image quality level in accordance with the number of sets.

In regard to the flow from step 1108 onward, because a description has been given already, only relevant portions shall be described.

The above-described processes are performed in steps 1108 and 1109.

Next, in step 1110, the CPU 901 generates the added information 401 for the recording sheet, the paper fingerprint of which has been read in step 1108, and writes the generated added information 401 in the RFID tag of the recording sheet on which recording is to be performed.

The added information 401 in step 1110 shall now be described. Because at this point, copied image data are to be printed on the recording sheet, the attribute information 403 is set to "copy". In regard to the low-resolution image path information 404, the CPU 901 uses the low-resolution image path information used in the renewal of the low-resolution image management table 1013 in step 1115 that is the renewal previous to the renewal in the present step. In regard to the high-resolution image path information 405, the CPU 901 uses the high-resolution image path information used in the renewal of the high-resolution image management table 1014 in step 1118 that is the renewal previous to the renewal in the present step. Furthermore, in regard to the image quality level information 406, the image quality level, set in the renewal of the high-resolution image management table 1014 in step 1118 that is the renewal previous to the renewal in the present step, is used.

Next, steps 1111 and 1112 are performed in the same manner as described above.

Then, the flow in a case where the image quality level in the judgment of the image quality level of the high-resolution image data in step 1113 is level 2 shall now be described. In this case, step 1119 is entered.

In step 1119, the CPU 901 judges whether or not the number of sets of image data stored in the directory, designated by the low-resolution image path determined in step 1113, has reached the upper limit value of 50. If the upper limit value has not been reached, step 1114 is entered and because the flow from there onward has been described already, description thereof shall be omitted.

If in the judgment in step 1119, it is judged that the upper limit value has been reached, step 1120 is entered. In step 1120, the CPU 901 judges whether or not the image quality levels of all sets of image data stored in the directory, designated by the low-resolution image path determined in step 1113, are level 1. If all of the image quality levels are level 1, because further improvement of the image quality cannot be anticipated by the super-resolution processing, step 1108 is entered without reading document image data anew and further without performing the super-resolution processing. Because the flow from step 1108 onward has been described already, description thereof shall be omitted.

If in step 1120, the CPU 901 judges that the image quality levels of all sets of image data stored in the directory, designated by the low-resolution image path determined in step 1113, are not level 1, step 1121 is entered.

In step 1121, the CPU 901 extracts, from among the image data stored under the directory designated by the low-resolution image path determined in step 1113, the image data having the same image quality level as or a lower image quality level than the image quality level of the document that is currently being read.

Next, the CPU 901 references the low-resolution image management table 1013 and deletes, from among the image data extracted in step 1121, the image data of the oldest reading date/time (step 1122).

Next, step 814 is then entered, and because the flow from here onward has been described already, description thereof shall be omitted.

Each individual sheet is identified using the RFID tag and each individual sheet is managed in association with the added information in the present embodiment as well. Furthermore, by using the document image data that are read and the image data that had been read from the same document previously to perform the super-resolution processing, a copy of an image quality that can be obtained at a resolution not less than the resolution of the scanner or other reading device can be provided with the present embodiment as well.

Other Embodiments

The present invention can be applied to a system configured from a plurality of equipment (for example, a computer, an interface equipment, a reader, a printer, etc.) as well as to an apparatus made up of a single equipment (a multifunction apparatus, a printer, a facsimile apparatus, etc.).

A processing method, where a program, which makes the configuration of any of the above-described embodiments operate to realize the above-described functions of the embodiment, is stored in a memory medium and the program stored in the memory medium is read as codes and executed on a computer, is also included within the scope of the above-described embodiments. That is, a computer-readable memory medium is also included within the scope of the embodiments. Further, not only a memory medium in which the above mentioned computer program is stored but the computer program itself is also included among the above-described embodiments.

As the memory medium, for example, a floppy (registered trademark) disk, a hard disk, an optical disk, a magneto-optical disk, a CD-ROM, a magnetic tape, a non-volatile memory card, or a ROM may be used.

Not only a configuration with which processing is executed solely by the program stored in the above mentioned memory medium, but a configuration where the program operates on an OS in cooperation with other software and extension board functions to execute the operations of any of the above-described embodiments is also included within the scope of the above-described embodiments. The object of the present invention is also achieved by a computer reading program codes, which realize the procedures of the flowcharts indicated for the above-described embodiments, from a computer-readable memory medium storing the program codes and executing the program codes. In this case, the program codes, read from the memory medium, realize per se the functions of the above-described embodiments. The program codes and the memory medium storing the program codes can also make up the present invention.

As the memory medium for supplying the program codes, for example, a floppy (registered trademark) disk, a hard disk, an optical disk, a magneto-optical disk, a CD-ROM, CD-R, a magnetic tape, a non-volatile memory card, or a ROM may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-164853, filed Jun. 24, 2008, which is hereby incorporated by reference herein in its entirety.

What is claimed is:

1. An image forming apparatus comprising:
   a means for optically scanning a document and thereby reading an image and acquiring read image data;
   a image forming means for forming an image on a recording medium;
   a means for reading identification information unique to the recording medium;
   a high-resolution image data acquiring means for applying super-resolution processing on a plurality of sets of image data and thereby acquiring high-resolution image data of higher resolution than the plurality of sets of image data;
   a means for generating added information concerning the image formed on the recording medium; and
   a memory for storing the read image data,
   wherein the added information is managed in association with the identification information unique to the recording medium,
   the added information includes information indicating a storage location, in the memory, of the read image data acquired from the scanned document,
   the high-resolution image data acquiring means acquires, from the memory and on basis of the information indicating the storage location of the read image data, a plurality of sets of read image data, which had been acquired from the scanned document, and applies the super-resolution processing on the acquired sets of read image data to acquire the high-resolution image data, and
   the image forming means forms the image on the recording medium based on the high-resolution image data.

2. The image forming apparatus according to claim 1, further comprising:
   a means for reading identification information unique to the document; and a means for judging whether or not the identification information unique to the document that has been read is managed in association with added information, wherein when it is judged that the identification information unique to the document that has been read is not managed in association with the added information, the high-resolution image data acquiring means deems the read image data that have been read from the document as being the high-resolution image data, and the image forming means forms an image on the recording medium based on the high-resolution image data that are the read image data that have been read from the document.

3. The image forming apparatus according to claim 1, wherein the added information and the identification information are managed in association with each other by a management table.

4. The image forming apparatus according to claim 1, wherein the high-resolution image data are further stored in the memory, and the added information further includes information indicating a storage location of the high-resolution image data in the memory and information concerning an image quality of an image after the super-resolution processing.

5. The image forming apparatus according to claim 4, wherein the information concerning the image quality is information indicating an image quality level of the image after the super-resolution processing.

6. The image forming apparatus according to claim 4, wherein the information concerning the image quality is information indicating the number of sets of image data used in the super-resolution processing.

7. The image forming apparatus according to claim 1, wherein the identification information is paper fingerprint information.

8. The image forming apparatus according to claim 1, wherein the identification information is an RFID tag added to a recording medium.

9. An image forming method comprising:

a step of reading identification information unique to a document;

a step of judging whether or not the read identification information unique to the document is managed in association with added information that includes information indicating a storage location of read image data acquired in relation to the document; and a step comprising, in a case where it is judged that the read identification information unique to the document is managed in association with the added information:

a step of optically scanning the document to read an image and acquire read image data;

a step of applying super-resolution processing on the acquired read image data and read image data, which had been acquired from the document up to a previous acquisition, to acquire high-resolution image data of higher resolution than any of the read image data;

a step of forming an image on a recording medium based on the high-resolution image data; and a step of storing, in an associated manner, identification information unique to the recording medium and the added information includes information indicating storage locations of read image data that had been acquired up to a present point in relation to the document.

10. The image forming method according to claim 9 further comprising, a step including in a case where it is judged that the read identification information unique to the document is not managed in association with the added information:

a step of optically scanning the document to read an image and acquire read image data;

a step of storing, in an associated manner, the identification information unique to the recording medium and the added information that includes the information indicating the storage location of the read image data; and a step of forming an image on the recording medium based on the read image data that have been acquired.

11. The image forming method according to claim 9, wherein the added information and the identification information are managed in association with each other by a management table.

12. The image forming method according to claim 9, wherein the added information further includes information indicating a storage location of the high-resolution image data and information concerning an image quality of an image after the super-resolution processing.

13. The image forming method according to claim 12, wherein the information concerning the image quality is information indicating an image quality level of the image after the super-resolution processing.

14. The image forming method according to claim 12, wherein the information concerning the image quality is information indicating the number of sets of image data used in the super-resolution processing.

15. The image forming method according to claim 9, wherein the identification information is paper fingerprint information.

16. The image forming method according to claim 9, wherein the identification information is an RFID tag added to a recording medium.

17. A non-transitory memory medium storing a computer-readable program for making the computer execute the image forming method according to claim 9.

* * * * *